US012693258B2

(12) United States Patent
Andrade et al.

(10) Patent No.: US 12,693,258 B2
(45) Date of Patent: Jul. 28, 2026

(54) ELECTROCHEMICAL SENSOR IN CONFIGURATION THEREOF

(71) Applicant: UNIVERSIDAD ROVIRA I VIRGILI (URV), Tarragona (ES)

(72) Inventors: Francisco Javier Andrade, Tarragona (ES); Pär Robert Erik William Blanking, Tarragona (ES); Pascal Blondeau, Tarragona (ES); Jhonattan Frank Baez Vasquez, Tarragona (ES)

(73) Assignee: UNIVERSIDAD ROVIRA I VIRGILI, Tarragona (ES)

( * ) Notice: Subject to any disclaimer, the term of this patent is extended or adjusted under 35 U.S.C. 154(b) by 210 days.

(21) Appl. No.: 18/682,404

(22) PCT Filed: Aug. 8, 2022

(86) PCT No.: PCT/EP2022/072177
§ 371 (c)(1),
(2) Date: Feb. 8, 2024

(87) PCT Pub. No.: WO2023/016954
PCT Pub. Date: Feb. 16, 2023

(65) Prior Publication Data
US 2024/0353368 A1 Oct. 24, 2024

(30) Foreign Application Priority Data
Aug. 9, 2021 (EP) ..................................... 21382751

(51) Int. Cl.
*G01N 27/406* (2006.01)
(52) U.S. Cl.
CPC .................................. *G01N 27/406* (2013.01)
(58) Field of Classification Search
CPC .......................... G01N 27/406; G01N 27/3272
See application file for complete search history.

(56) References Cited

U.S. PATENT DOCUMENTS

| | | | |
|---|---|---|---|
| 6,306,285 B1 | 10/2001 | Narayanan et al. | |
| 2008/0248354 A1* | 10/2008 | Kubo | H01M 8/16 |
| | | | 429/458 |
| 2010/0025241 A1 | 2/2010 | Hane et al. | |

FOREIGN PATENT DOCUMENTS

WO    WO 2013039455 A1    3/2013

OTHER PUBLICATIONS

Komkova et al., "Noiseless Performance of Prussian Blue Based (Bio)sensors through Power Generation," *Analytical Chemistry* 89:6290-6294, May 25, 2017. (5 pages).
(Continued)

*Primary Examiner* — Alexander S Noguerola
(74) *Attorney, Agent, or Firm* — Seed Intellectual Property Law Group LLP

(57) ABSTRACT

The present invention refers to an electrochemical sensor for determining the presence and/or the concentration of a target analyte in an aqueous solution, comprising: a front electrode comprising pores permeable to the aqueous solution and comprising a sensitive surface to the target analyte; an electrolytic conductor bridge permeable to the aqueous solution; and a back electrode comprising at least a surface and optionally a support. The front electrode and the back electrode are electrically connected via the electrolytic conductor bridge and the front electrode comprises pores above 0.2 pm of equivalent diameter that connect the external surface of the front electrode and the electrolytic conductor bridge. The electrochemical sensor is configured so that the aqueous solution enters in contact with the back electrode through the electrolytic conductor bridge, which in turn enters in contact with the aqueous solution through the pores of the front electrode. The electrochemical sensor further comprises means for determining the difference in the electrochemical state between the front electrode and the back electrode; and the determination of such difference in
(Continued)

the electro-chemical state indicates the target analyte presence and/or concentration in the aqueous solution.

19 Claims, 11 Drawing Sheets

(56) References Cited

OTHER PUBLICATIONS

Liu et al., "Miniature Amperometric Self-Powered Continuous Glucose Sensor with Linear Response," *Analytical Chemistry* 84:3403-3409, Mar. 14, 2012. (7 pages).

Lu et al., "Solid-state amperometric hydrogen sensor based on polymer electrolyte membrane fuel cell," *Sensors and Actuators B: Chemical* 107:812-817, Jun. 29, 2005 [Published online Jan. 14, 2005]. (6 pages).

Merino-Jimenez et al., "A Self-Powered Minimalistic Glucometer: A Lean Approach to Sustainable Single-Use Point-of-Care Devices," *Advanced Materials Technologies* 6:2001051, Mar. 24, 2021. (10 pages).

Sekretaryova et al., "A cholesterol self-powered biosensor," *Analytical Chemistry* Accepted Manuscript, Aug. 28, 2014. (29 pages).

Slaughter et al., "A self-powered glucose biosensing system," *Biosensors and Bioelectronics* 78:45-50, Nov. 11, 2015. (6 pages).

* cited by examiner

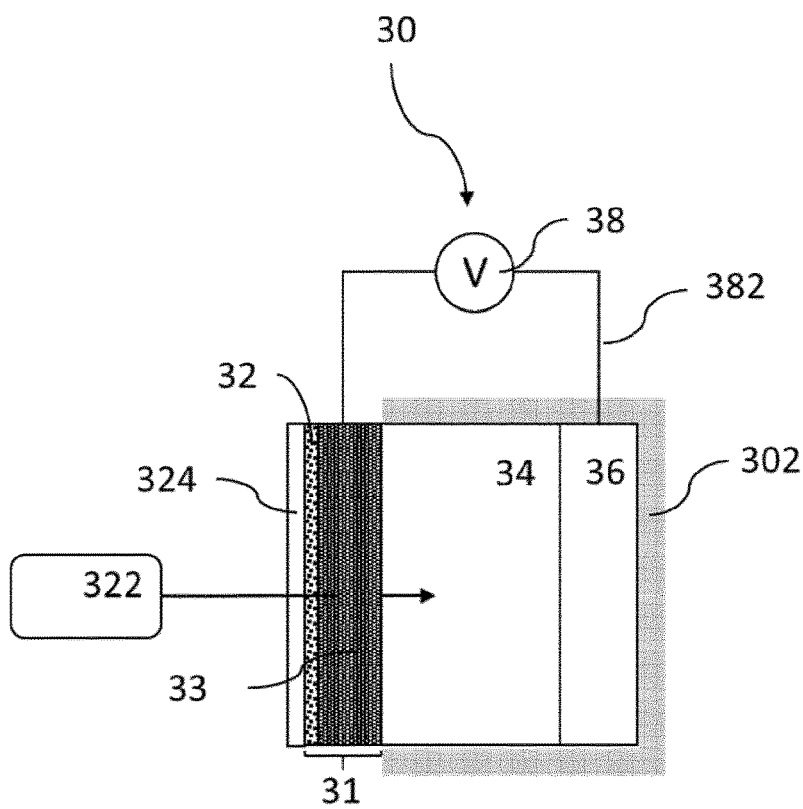

Fig. 3

| Front | Back | Detection | Performance | Conditions |
|---|---|---|---|---|
| Pt/Nafion | Pt/Nafion | Yes | LOG 7.06 µA/dec (-3-2) | Conventional amp. cell |
| Dropsens Pt | Dropsens Pt | Yes | -1.6 µA/mM (0-10 mM) | Conventional amp. cell |
| Au | Au | No | - | Conventional amp. cell |
| Pt | Au | No | - | Conventional amp. cell |
| Pt | Ag/AgCl | Yes | -15.6 µA/mM (0-1 mM) | Conventional amp. cell |
| Pt | Zn | Yes | High drift, no use as a sensor | Conventional amp. cell |
| Pt | CNT | No | - | Conventional amp. cell |
| Pt/Nafion | Pt | Yes | 4.3 µA/mM (0-0.1 mM) | Self powered, no stirring |
| Pt/Nafion | Pt | Yes | 8.5 µA/mM (0-0.1 mM) | Self powered, no stirring |
| Pt/Nafion | Pt | Yes | 8.5 µA/mM (0-0.1 mM) | +0.1V applied, no stirring |
| Pt/Nafion | Pt | Yes | 10.8 µA/mM (0-0.01 mM) | +0.1V applied, no stirring |
| Pt/Nafion | Ag/AgCl | No | - | Self powered, no stirring |

Fig. 4

1
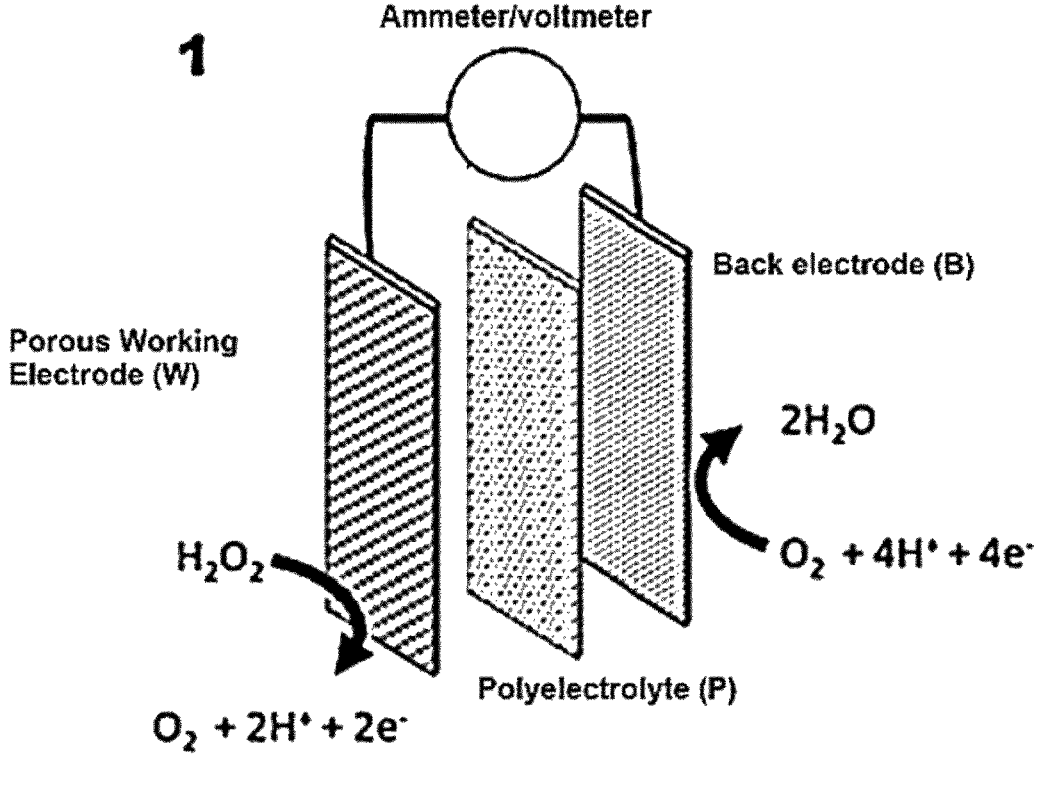
Ammeter/voltmeter
Back electrode (B)
Porous Working Electrode (W)
$2H_2O$
$O_2 + 4H^+ + 4e^-$
$H_2O_2$
Polyelectrolyte (P)
$O_2 + 2H^+ + 2e^-$
2
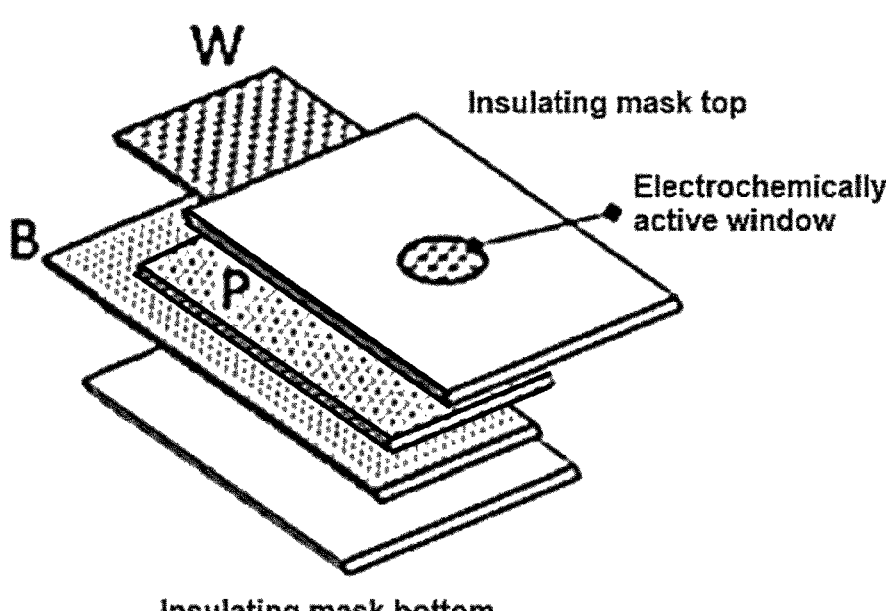
W
Insulating mask top
B
Electrochemically active window
P
Insulating mask bottom
Fig. 5

3

B      W y = 8.4662x + 0.0472
R² = 0.9994

[H₂O₂] (µM)

1

ELECTROCHEMICAL SENSOR IN CONFIGURATION THEREOF

TECHNICAL FIELD OF THE INVENTION

The present invention pertains to the life sciences, including medical, veterinary, botanic, well-being, nutrition, food manipulation, in-vivo diagnostics, in-vitro diagnostics and prognosis particularly to the determination of the presence and/or concentration of analytes in samples by using electrochemical sensors. More particularly, the present invention solves the problem of having to expose several electrodes to the solution containing the target analyte or having to use complex systems with reference electrodes and/or internal solutions, and the problem of interferences by redox-active species; by exposing only one electrode to the solution and making it porous so that the solution can percolate through it and reach the back electrode.

BACKGROUND OF THE INVENTION

This discussion is believed to be helpful in providing the reader with background information to facilitate a better understanding of the various aspects of the present embodiments. Accordingly, it should be understood that these statements are to be read in this light, and not as admissions of prior art.

Electrochemical sensors can be used to detect chemical compounds in a solution (analytes). It is well known that any analyte that can be oxidized or reduced is a candidate for this type of detection.

The use of electrochemical sensors is common in different areas across the life-sciences industry. For example, electrochemical sensors can serve to monitor analytes in a human being either in a hospital (ICU monitoring) or out-of-hospital environment (wearables), tracking drugs and diseases in animals and plants to control epidemics, detecting viruses in all kind of animals, controlling nutrition values in humans and animals, tracking allergies, monitoring food processing and manufacturing contamination levels, as well as performing in-vitro diagnostics and prognosis of all kind.

A desired application of this electrochemical sensors has been the measurement of glucose. Diabetic people have the need to frequently measure and control their glucose levels in blood to ensure levels are maintained within a certain range. Therefore, several technologies have been developed in this direction, looking for ways to detect glucose in blood using electrochemical sensors, either amperometric or potentiometric cells.

Initially the use of hydrogen peroxide sensitive cells was developed, as glucose oxidase can easily oxidise glucose into hydrogen peroxide ($H_2O_2$) and is therefore a suitable marker of the presence and/or concentration of glucose in a determined solution, such as blood. With a simple glucose oxidase-based sensor, the following enzymatic reaction of glucose oxidase is exploited:

$$Glucose + O_2 \xrightarrow{\text{Glucose oxidas}} Gluconolactone + H_2O_2$$

Then, the hydrogen peroxide ($H_2O_2$) is monitored using the electrochemical sensor, wherein the hydrogen peroxide is oxidised as follows:

$$H_2O_2 \rightarrow 2H^+ + O_2 + 2e^-$$

2

Next the current generated by the hydrogen peroxide oxidation can be associated to the concentration of glucose, as it is a byproduct of its decomposition catalysed by the glucose oxidase. The sensitivity of this method is limited by the exposed area of the working electrode to the electroactive substance, in this case the hydrogen peroxide. As the sensing device comprises the working electrode, the counter electrode and the reference electrode, only a fraction of the total area in contact with the solution serves as a redox active detection surface.

However, the direct amperometric detection of peroxide is complex. The materials that can be used—such as platinum—must be operated at a working potential that makes the sensor susceptible of serious interferences by redox-active species, such as ascorbic acid. One additional problem of the oxidase-based systems is the consumption of oxygen, which is required to produce $H_2O_2$. This has been typically overcome by the use of membranes that limit the flow of glucose and thus reduce the consumption of oxygen.

These problems have been the leitmotiv of the progress on this field that has given way to several "generations" of new sensors. The solutions proposed fall in one of the following strategies:

a. Using permselective membranes to protect the surface of the electrode, such as tetrafluoroethylene-perfluoro-3,6-dioxa-4-methyl-7-octenesulfonic acid copolymer. This is useful, but it is not totally effective and may reduce the sensitivity, as in amperometric sensors, the current is proportional to the surface of the working electrode. Coatings reduce such area, and therefore reduce the sensibility of the cell in this configuration.

b. Using redox mediators to reduce the working potential and improve the electron transfer efficiency.

c. Most of the approaches to detect glucose (classically based on $H_2O_2$) have tried to measure other type of enzyme-product analytes different to $H_2O_2$ in order to confront with the problem of ascorbic acid interferences. However, such approaches significantly reduce the sensitivity.

There is therefore a need for electrochemical cells sensitive to hydrogen peroxide that can overcome the interference problems with redox-active species and the consumption of oxygen of the oxidase-based systems without reducing the sensitivity. As the users of these systems are not medicalized, the obtention of blood requires an invasive method (such as a blood fingerprick, or a continuous monitoring system through needle) to obtain a sample where the glucose can be measured. There is therefore a need to increase the sensitivity of these systems as not just the quality of the measurement is increased, but also the experience can be made less uncomfortable for the user. Furthermore, if the glucometer amperometric sensor can be made independent of an external power source, smaller wearable devices, with better reliability can be achieved.

Further amperometric biosensors have achieved what it is known as self-powered sensors. These are amperometric sensors that employ the energy generated by a biochemical reaction in the solution to obtain the energy for functioning and therefore don't rely on external power sources. For example, a cholesterol self-powered biosensor has been achieved, in which both cathodic and anodic bio-electrocatalytic reactions are powered by the same substrate (Vagin et al, 2014. Analytical chemistry, 86(19), 9540-9547). It employed cholesterol oxidase to obtain hydrogen peroxide, which is reduced in the cathode using Prussian blue as a redox mediator, while the cholesterol is oxidized in the anode by mediated cholesterol oxidase. Also, it has already been described a miniature amperometric self-powered continuous glucose sensor (SPGS) with linear response (Liu et, al, Analytical Chemistry 2012 84 7), 3403-3409). The system comprised a wired glucose oxidase anode; a Platinum/Carbon cathode; an overlying glucose flux-limiting membrane; and a resistor bridging the anode and cathode. In the anode, the glucose was decomposed into $H_2O_2$, which then was oxidized giving rise to hydrogen ions. On the other hand, the cathode reduced hydrogen ions and oxygen into water molecules. In a further self-powered glucometer implementation, the generated charge was transferred to a capacitor, whose voltage could be correlated to the concentration of glucose (Merino-Jimenez et al., 2021 Adv. Mater. Technol., Volume 6, Issue 5 200105). Also, a self-powering glucose biosensing system constructed by combining a bioanode and a biocathode with immobilized enzymes has been described (Slaughter et. al, Biosens Bioelectron. 2016; 78:45-50). It directly detected the electron transfer from the glucose and is constructed by combining a charge pump integrated circuit and a capacitor. Finally, another Prussian blue Based biosensor, achieved high performance with reduced noise when detecting hydrogen peroxide (Komkova et al, Anal. Chem. 2017, 89, 12, 6290-6294).

Although these self-powered electrodes overcame the need for a power source for the sensor to work, they were complex and still cannot increase significatively the exposed area that is sensing, i.e. the sensing area of the electrode was still a reduced part of the whole exposed area. In 2013, an amperometric sensor for measuring the amount of hydrogen peroxide ($H_2O_2$) present in a sample was described, comprising a working electrode in contact with a sensing solution, wherein the working electrode comprises a porous membrane structure (WO 2013/039455 A1). This system only required the working electrode to be exposed to the sensing solution, as the counter electrode used a reference solution to compensate the redox equation and close the circuit. Although this allowed to increase the sensitivity of the sensor, it further complicated the sensor configuration, not just in the fabrication of the nano- and microporous membranes, but also depended on a reference solution that should be contained in the sensor and the sensor became bulkier.

Therefore, there is still a need to increase the sensitivity of these systems without increasing their complexity and size. Furthermore, due to the redox reactions needed in order to obtain a current, either different electrodes must be used in the same solution, or different environments must be presented to each electrode when made of the same material. Finally, there is also a need to find better ways of detecting hydrogen peroxide in continuous flow mode without the interference of ascorbic acid and other redox-active species.

In the present invention, we present a different configuration of a hydrogen peroxide sensitive self-powered cell wherein the working (front) electrode and the counter (back) electrode are connected through an electrolytic conductor bridge, and the working electrode is porous so that it allows the aqueous solution to reach the electrolytic conductor bridge and eventually the counter electrode. Therefore, only the working electrode is exposed to the problem solution, achieving a full use of the exposed area as a current generation surface, increasing the sensitivity to hydrogen peroxide. Furthermore, as the counter electrode is only in contact with the solution through the electrolytic conductor bridge, the chemical environment of the counter electrode is different to the one of the working electrode, as the solution reaching the counter electrode carries ions that result from the working electrode redox reaction and $H_2O_2$ levels are negligible. Thus, it allows the use of front and back electrodes made from the same materials, such as platinum, while it doesn't require building different chemical environments by adding reference solutions. Moreover, the present invention does not need second enzymes such as Horseradish Peroxidase in order to be able to detect the peroxide, but it can directly detect its oxidation at a suitable reaction rate. A further benefit of this configuration is that it produces no interferences due to ascorbic acid in continuous flow measurements, making it even a better sensor in such conditions.

This configuration, wherein only the front electrode is directly exposed to the aqueous solution containing the target analyte, and wherein the front electrode is porous so that the aqueous solution can percolate through it and effectively reach the back electrode through a electrolytic conductor bridge; can be further extended to other amperometric and potentiometric cells for other purposes. Therefore, a powered amperometric sensor further comprising a voltage source between the working and the counter electrodes, a traditional amperometric sensor further comprising a reference electrode, and a potentiometric sensor (wherein the back electrode is the reference electrode) are possible with the aforementioned configuration. To the best of our knowledge, this is the first report for this kind of configuration for the detection of chemical species in solution, a schematic view of such configuration is provided in FIG. 1A.

BRIEF DESCRIPTION OF THE INVENTION

The invention described herein can be summarized as follows:

A first aspect of the invention refers to an electrochemical sensor for determining the presence and/or the concentration of a target analyte in an aqueous solution, comprising:
- a front electrode comprising pores permeable to the aqueous solution and comprising a sensitive surface to the target analyte;
- an electrolytic conductor bridge permeable to the aqueous solution; and
- a back electrode comprising at least a surface, preferably a sensitive surface, and optionally a support;

In this first aspect of the invention, the front electrode and the back electrode are electrically connected via the electrolytic conductor bridge; the front electrode comprises pores above 0.2 µm of equivalent diameter that connect the external surface of the front electrode and the electrolytic conductor bridge; and the electrochemical sensor is configured so that the aqueous solution enters in contact with the back electrode through the electrolytic conductor bridge, which in turn enters in contact with the aqueous solution through the pores of the front electrode. Furthermore, the electrochemical sensor comprises means for determining the difference in the electrochemical state between the front electrode and the back electrode; and the determination of such difference in the electrochemical state indicates the target analyte presence and/or concentration in the aqueous solution.

In a preferred embodiment of the first aspect of the invention, the front electrode comprises a pore density configured to provide a Herzberg flow rate lower than 2500 s/100 mL. More preferably, the front electrode comprises pores preferably between 0.2 µm and 50 µm, more preferably between 1 µm and 25 µm, and even more preferably between 1.5 µm and 10 µm of equivalent diameter.

In a further preferred embodiment of the first aspect of the invention or of any of its preferred embodiments, the electrochemical sensor is a current-based sensor such that the front electrode is the working electrode and the back electrode is the counter electrode; the counter electrode carries out a complementary Faradaic reaction to the reaction carried out in the working electrode; and the means for determining the difference in the electrochemical state is connected between the front electrode and the back electrode and configured to measure a current flowing between the front electrode and the back electrode. Such means might be an ammeter, a resistor, capacitor or any other electric means as well as combinations thereof. From herein after, when the electrochemical sensor of the first aspect of the invention is a current-based sensor as defined herein, it will be referred as the "current-based embodiment".

In a preferred embodiment of the current-based embodiment, the sensor employs the energy generated at the interface of the front electrode when in contact with the aqueous solution to power the sensor. Alternatively, the sensor further comprises a voltage source connected between the front electrode and the back electrode configured to apply a potential between the electrodes.

In a further preferred embodiment of the current-based embodiment or of any of its preferred embodiments, the sensitive surface of the front porous electrode is a hydrogen peroxide sensitive surface and is selected from any of the following list consisting of: copper, nickel, Prussian blue-coated materials, Prussian blue-coated composites, palladium, palladium nanomaterials and platinum or platinum derivatives such as black platinum and platinum nanomaterials; so that the current-based sensor is configured to selectively measure hydrogen peroxide as the target analyte. From herein after, when the current-based sensor embodiment is further hydrogen peroxide sensitive as described herein, it will be referred as the "hydrogen peroxide sensitive current-based embodiment".

In a preferred embodiment of the hydrogen peroxide sensitive current-based embodiment, the electrolytic conductor bridge connecting the electrodes is selected from any of the following list consisting of: a polyelectrolyte, a solid polymer electrolyte, an ionogel and a ionomer such as tetrafluoroethylene-perfluoro-3,6-dioxa-4-methyl-7-octene-sulfonic acid copolymer. More preferably, the back electrode comprises a conductive material selected from any of the following list consisting of: zinc, silver/silver chloride, conducting polymers such as PEDOT-PSS and platinum or platinum derivatives such as platinum-coated carbon materials and platinum nanomaterials, preferably platinum.

In another preferred embodiment of the hydrogen peroxide sensitive current-based embodiment or of any of its preferred embodiments, the hydrogen peroxide sensitive surface of the front electrode and the back electrode comprise or are made of platinum, and more preferably, the electrolytic conductor bridge is tetrafluoroethylene-perfluoro-3,6-dioxa-4-methyl-7-octenesulfonic acid copolymer.

In an alternative further preferred embodiment of the first aspect of the invention or of any of its preferred embodiments, the electrochemical sensor is a potential-based sensor; such that the front electrode is the working electrode and the back electrode is the reference electrode; the reference electrode provides a stable potential; and the means for determining the difference in the electrochemical state is connected between the front electrode and the back electrode and configured to measure the difference in voltage between the front electrode and the back electrode. From herein after, when the electrochemical sensor of the first aspect of the invention is a potential-based sensor as defined herein, it will be referred as the "potential-based embodiment".

In a preferred embodiment of the potential-based embodiment, the front porous electrode is a hydrogen peroxide selective electrode and its sensitive surface is selected from any of the following list consisting of: platinum, Prussian blue, zinc, copper, gold, preferably platinum; so that the potential-based sensor is configured to selectively measure hydrogen peroxide as the target analyte. From herein after, when the potential-based sensor embodiment is further hydrogen peroxide sensitive as described herein, it will be referred as the "hydrogen peroxide sensitive potential-based embodiment".

In a preferred embodiment of the hydrogen peroxide sensitive potential-based embodiment, the electrolytic conductor bridge connecting the electrodes is selected from any of the following list consisting of: a polyelectrolyte, a solid polymer electrolyte, an ionogel and a ionomer such as tetrafluoroethylene-perfluoro-3,6-dioxa-4-methyl-7-octene-sulfonic acid copolymer. More preferably, the reference electrode comprises a conductive material selected from any of the following list consisting of: silver, platinum, gold, nickel, zinc, copper, silver/silver chloride, conducting polymers with a redox-active surface such as PEDOT-PSS, aluminium and carbon.

In another preferred embodiment of the hydrogen peroxide sensitive potential-based embodiment or of any of its preferred embodiments, the hydrogen peroxide selective electrode and the reference electrode comprise or are made of platinum, and more preferably, the electrolytic conductor bridge is tetrafluoroethylene-perfluoro-3,6-dioxa-4-methyl-7-octenesulfonic acid copolymer.

In another preferred embodiment of the first aspect of the invention or of any of its preferred embodiments, the front electrode and/or the back electrode further comprise a support which in turn comprises a conductive material.

In another preferred embodiment of the first aspect of the invention or of any of its preferred embodiments, the front electrode, the electrolytic conductor bridge and the back electrode are configured so that these are stacked, and preferably they are vertically stacked. More preferably, the front electrode is directly above the back electrode.

In another preferred embodiment of the first aspect of the invention or of any of its preferred embodiments, the electrochemical sensor is covered so that when immersed, only the front electrode is exposed to the aqueous solution to be tested.

In another preferred embodiment of the first aspect of the invention or of any of its preferred embodiments, the front electrode is coated with tetrafluoroethylene-perfluoro-3,6-dioxa-4-methyl-7-octenesulfonic acid copolymer.

In another preferred embodiment of the first aspect of the invention or of any of its preferred embodiments, the front electrode and the back electrode are made of the same material, preferably platinum.

In a preferred embodiment of any of the hydrogen peroxide sensitive embodiments (either current-based or potential-based) or of any of their preferred embodiments, the front electrode is functionalized with an oxidase or dehydrogenase enzyme selected from the group consisting of glucose oxidase, glucose dehydrogenase, cholesterol oxidase, cholesterol dehydrogenase, lactate oxidase, lactate dehydrogenase, bilirubin oxidase, bilirubin dehydrogenase, amino acids oxidase and amino acids dehydrogenase; and configured to produce hydrogen peroxide when in contact with the target analyte that the electrochemical sensor measures. From herein after, when any of the hydrogen peroxide sensitive embodiments are further functionalised as described herein, they will be referred as the "first functionalised embodiment".

In another preferred embodiment of any of the hydrogen peroxide sensitive embodiments (either current-based or potential-based) or of any of their preferred embodiments, a sensor system comprises the hydrogen peroxide sensitive sensor, and the electrochemical sensor (preferably the front electrode) is functionalised with a capture entity that captures the target analyte. From herein after, when any of the hydrogen peroxide sensitive embodiments are further functionalised as described herein, they will be referred as the "second functionalised embodiment".

In a preferred embodiment of the second functionalised embodiment, the system further comprises means for detecting the target analyte wherein said means are at least a detection entity and a substrate and said detection entity is capable of detecting the target analyte and is labelled with an enzyme capable of producing hydrogen peroxide when exposed to the substrate.

A second aspect of the invention refers to a method of determining the presence and/or concentration of a target analyte in an aqueous solution, the method comprising:

a. contacting the aqueous solution with the sensitive surface of the front electrode of any of the embodiments of the first aspect of the invention but the first or second functionalised embodiments;

b. determining the difference in the electrochemical state between the front electrode and the back electrode; and c. determining the presence and/or concentration of the analyte in the aqueous solution based on the difference in the electrochemical state.

An alternative embodiment of the second aspect of the invention refers to a method of determining the presence and/or concentration of a target analyte in an aqueous solution through the measurement of hydrogen peroxide, the method comprising:

a. contacting the aqueous solution with the sensitive surface of the front electrode of the first functionalised embodiment of the first aspect of the invention;

b. determining the difference in the electrochemical state between the front electrode and the back electrode;

c. determining the presence and/or concentration of the hydrogen peroxide in the aqueous solution based on the difference in the electrochemical state; and d. determining the presence and/or concentration of the target analyte in the aqueous solution based on the determined concentration of hydrogen peroxide.

Another alternative embodiment of the second aspect of the invention refers to a method for determining the presence and or concentration of a target analyte in an aqueous solution wherein the method comprises:

a. contacting the aqueous solution with the sensitive surface of the front electrode of the second functionalised embodiment of the first aspect of the invention or of its preferred embodiment, so that the capture entity binds to the target analyte if present;

b. contacting the sensitive surface of the front electrode of the electrochemical sensor of step a) with the detection entity so that the detection entity binds to the target analyte if present;

c. optionally rinsing the sensitive surface; and adding the substrate so as to produce hydrogen peroxide if the labelled detection entity is present;

d. determining the difference in the electrochemical state between the front electrode and the back electrode; and e. determining the presence and/or concentration of the target analyte in the aqueous solution based on the difference in the electrochemical state.

Another alternative embodiment of the second aspect of the invention refers to a method for determining the presence and or concentration of a target analyte in an aqueous solution wherein the method comprises:

a. contacting the aqueous solution with the sensitive surface of the front electrode the second functionalised embodiment of the first aspect of the invention or of its preferred embodiment so that the capture entity binds to the target analyte if present;

b. contacting the sensitive surface of the front electrode of the electrochemical sensor of step a) with the detection entity so that the detection entity binds to the target analyte if present;

c. optionally rinsing the sensitive surface; and adding the substrate so as to produce hydrogen peroxide if the labelled detection entity is present;

d. determining the difference in the electrochemical state between the front electrode and the back electrode; and e. determining the presence and/or concentration of the hydrogen peroxide in the aqueous solution based on the difference in the electrochemical state; and f. determining the presence and/or concentration of the target analyte in the aqueous solution based on the determined concentration of hydrogen peroxide.

In a preferred embodiment of any of the alternatives of the second aspect of the invention, the aqueous solution is contacted to the front electrode of the electrochemical sensor by immersing the sensor in the solution. Alternatively, the aqueous solution is contacted to the front electrode of the electrochemical sensor by adding a single volume of the solution to the sensor. In a further alternative, the aqueous solution is contacted to the front electrode of the electrochemical sensor by exposing the sensor to a continuous flow of the solution.

In a preferred embodiment of any of the alternatives of the second aspect of the invention or of any of its preferred embodiments, the porous sensitive surface of the front electrode support is formed by a sputtering an electroactive material and/or applying nanoparticles of the electroactive material over the front electrode support.

BRIEF DESCRIPTION OF THE FIGURES

FIG. 3: Potential-based sensor schematic view with support, coating and casing.

FIG. 4: Performance table of the sensor with each of the electrode materials under different configurations.

DESCRIPTION OF THE INVENTION

Figure 1A:
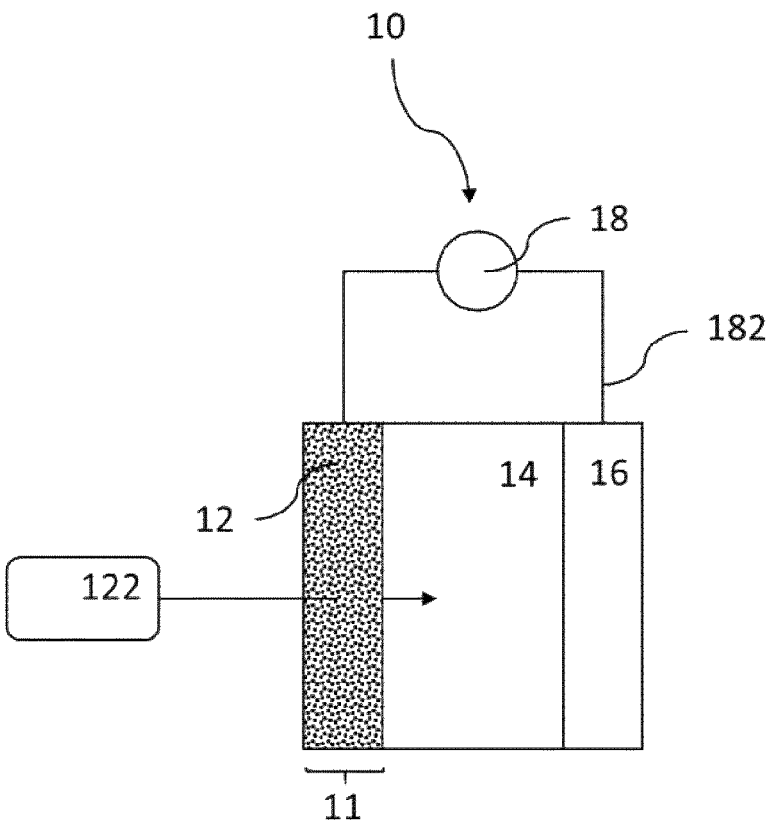
FIG. 1: Electrochemical sensor schematic view. a) Without support b) With support in the front electrode.

The following discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Definitions

As used herein and in the appended claims, the singular forms "a", "an" and "the" include plural referents unless the context clearly dictates otherwise. Also, the use of "or" means "and/or" unless stated otherwise. Similarly, "comprise," "comprises," "comprising" "include," "includes," and "including" are interchangeable and not intended to be limiting.

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

The publications discussed above and throughout the text are provided solely for their disclosure prior to the filing date of the present application. Nothing herein is to be construed as an admission that the inventors are not entitled to antedate such disclosure by virtue of prior disclosure.

As used herein, the words or terms set forth below have the following definitions.

The term "analyte" refers to a substance whose chemical constituents are being identified and measured.

The term "target analyte" refers to the analyte the sensor is specifically designed to determine its presence and/or concentration.

The term "chemical sensor" refers to a device that measures and detects chemical qualities in an analyte and converts the sensed chemical property into electronic data.

The term "difference in the electrochemical state" refers to any difference between the state of two electrodes or their environment, such as presence of a differential, current flowing from one electrode to the other one or any other chemical difference that can be electrically measured.

The term "electrochemical sensor" refers to any sensor or cell which employs chemical interactions in an electrode interface to monitor the presence and/or concentration of a substrate of said changes by measuring the difference in the electrochemical state between such electrode and another counter or reference electrode. These interactions might be Faradaic and/or non-Faradaic. When there are Faradaic processes involved, the counter electrode performs a reaction to balance the electrical charges. In potential-based measurements, when there are not Faradaic processes involved, the counter electrode might behave as a reference (or pseudo-reference) electrode. Also, the term "electrochemical cell" (i.e., the ensemble of working and counter electrode and the polyelectrolyte layer) might be used indistinctively unless stated otherwise.

The term "aqueous solution" or "electrolytic solution" is preferably understood as a fluid, such as whole blood, preferably undiluted whole blood, intracellular fluids, saliva, mucus, cerebrospinal fluid, blood sera, blood plasma, sweat, urine or any suitable buffer or problem solution. In the context of this invention, it is understood that the aqueous solution is not limited to fluids with an aqueous base, but it is extended to any fluid that can effectively percolate through the pores of the front electrode and the electrolytic conductor bridge.

The term "electrical connection" is preferably understood as connection by means of a conducting path that provides mobility to charge carriers, either electrons or ions.

The term "working electrode" is preferably understood as the electrode where the main interaction with the target analyte will occur.

The term "counter electrode" is preferably understood as the electrode providing a complementary faradaic reaction to the reaction carried out in the working electrode.

The term "reference electrode" is preferably understood as the electrode that serves as reference to establish a stable level of potential to which the changes in the working electrode potential are referred to.

The term "front electrode" is preferably understood as the electrode directly exposed to the aqueous solution, and unless stated otherwise it will be the working electrode and therefore used indistinctively.

The term "conductor bridge" is preferably understood as an element providing the ionic electrical connection between the electrodes.

The term "back electrode" is preferably understood as the electrode not directly exposed to the aqueous solution, and only exposed indirectly to the aqueous solution under certain conditions.

The term "pore" is preferably understood as minute opening in an element by which matter may pass through.

The term "equivalent diameter" is preferably understood, when referred to pores, as a pore with a shape that confers similar hydrodynamic properties as a circular pore of said diameter.

The term "macroporous" is preferably understood as a porous element which comprises pores above 0.2 μm of equivalent diameter so that the transport of elements of fluid with large ensemble of molecules can easily percolate through it. It is understood that the terms "macropore", "macroporosity" or any other related term is read under the light of this description.

The term "current-based sensor" is preferably understood as a sensor or cell that relies on electrical current (flow of electrons) to measure the concentration of the target analyte, which presence and/or concentration is being determined. It can be therefore understood similarly to what traditionally has been called an "amperometric sensor", although the preferred term "current-based sensor" has been employed to reinforce the special features of this invention that differentiates greatly from traditional amperometric sensors.

The term "potential-based sensor" is preferably understood as a sensor or cell that relies on the differential of voltage (more precisely, the electromotive force) between two electrodes to measure the concentration of the analyte, which presence and/or concentration is being determined. It has been differentiated from the term "potentiometric sensor" to widen the object of protection to any sensor relying on the potential between the electrodes and not just potentiometers, which has a stricter definition.

The term "composite" is preferably understood as any material made of at least two different substances.

The term "sensitive surface" is preferably understood as a surface made of a material that can effectively produce an electrochemically measurable interaction with the target analyte the sensor is designed to measure. It therefore confers the element it is part of, the same sensitive attribute. For example, for a sensor comprising an electrode comprising a hydrogen-peroxide sensitive surface, it can be said it is further a hydrogen-peroxide sensitive sensor and that it comprises a hydrogen-peroxide sensitive electrode. It is noted that the term "sensitive surface" when referring to the surface of the back electrode, refers to the surface made of a material that can effectively produce a complementary faradaic reaction to the reaction carried out in the working electrode (in the context of current-based sensors), or to the surface made of a material that can effectively serve as reference to establish a stable level of potential to which the changes in the working electrode potential are referred to (in the context of potential-based sensors).

The term "support" is preferably understood as an element that acts as a structural element for another component or components.

The term "electrode interface" is preferably understood as the surface of the electrode that enters in contact with an interacting element.

The term "capture entity" is preferably understood as any entity, such as an antibody, antigen, antibody-like entity, nucleic acids (DNAs, RNAs and their different forms), biotin, streptavidin or the like that captures the target analyte.

The term "substrate" is preferably understood in an enzymatic context as any substance that work as the precursor of a detectable substance.

The term "detection entity" is preferably understood as any entity, such as an antibody, antigen or antibody-like entity that further comprises a detection molecule such as an enzyme or any label that, when exposed to its a substrate that is its precursor, produces a reaction whose products can be detected.

The term "Herzberg flow" rate is defined as the time 100 ml of deaerated water takes to pass through a 10 cm$^2$ of filtration area at a constant hydrostatic head of 10 cm. In the present invention the density of the pores over the front porous electrode is defined by its filtration flow rate using the Herzberg flow rate.

All the figures described herein merely illustrate the present invention and do not limit the same.

Description

As already indicated, the present invention confronts the problem that for the detection of glucose (and other analytes) in solution by using electrochemical sensors or cells, at least two electrodes must be in contact with the solution, in particular the working electrode and a reference or counter electrode, which results in a series of practical issues. In current-based techniques, reduced working electrode area means lower sensitivity. Additionally, exposure of other electrodes to sample components may be source of error or instability. Current solutions only using one electrode require complex designs including reference solutions for the back electrodes. Such requirement makes these systems very dependent on the correct disposition of the electrodes used for the system to efficiently work. The present invention resolves this problem by connecting each of the electrodes of an electrochemical sensor or cell, by an electrolytic conductor bridge provided between the electrodes, wherein the surfaces of each electrode that contact the polyelectrolyte bridge permits to effectively connect them. By effectively putting in contact with the aqueous solution the back electrode with the aqueous solution using the electrolytic conductor bridge instead of directly exposing it to the solution, such electrochemical sensors or cells are not as dependent on the spatial distribution of the working and/or counter electrodes so that the circuit can be effectively closed through the solution, the sensing area can be increased to the full exposed area of the cell and can be easily miniaturized. Furthermore, as the exposed (front) electrode is macroporous such that the solution containing the analyte of interest is able to percolate through it and reach the back electrode(s), the system does not require additional solutions to work as reference solutions as the same solution is used in all electrodes.

That is, traditional amperometric measurements require the use of three electrodes (a measuring (working) electrode, a counter electrode and a reference electrode), and self-powered amperometric measurements and traditional potentiometric measurements require two electrodes (a measuring (working) electrode and a counter or reference electrode respectively). However, in the present invention, such measurements require the use of two electrodes (a front (measuring) electrode and a back electrode) the electrodes connected by an electrolytic conductor bridge where only the front electrode is exposed to the analyte and the circuit is closed through the electrolyte bridge, which has been previously contacted by the solution previously percolated through the porous front electrode. Some means for determining the difference in the electrochemical state between the front electrode and the back electrode will be used, such as an ammeter or voltmeter. Additionally, some electrical or electronic means—such as resistors or capacitors—can be added to the circuit to facilitate or enhance the measurements. The difference in the electrochemical state between front electrode and the back electrode will be related to the concentration of the analyte, which presence and/or concentration is being determined.

Figure 11:
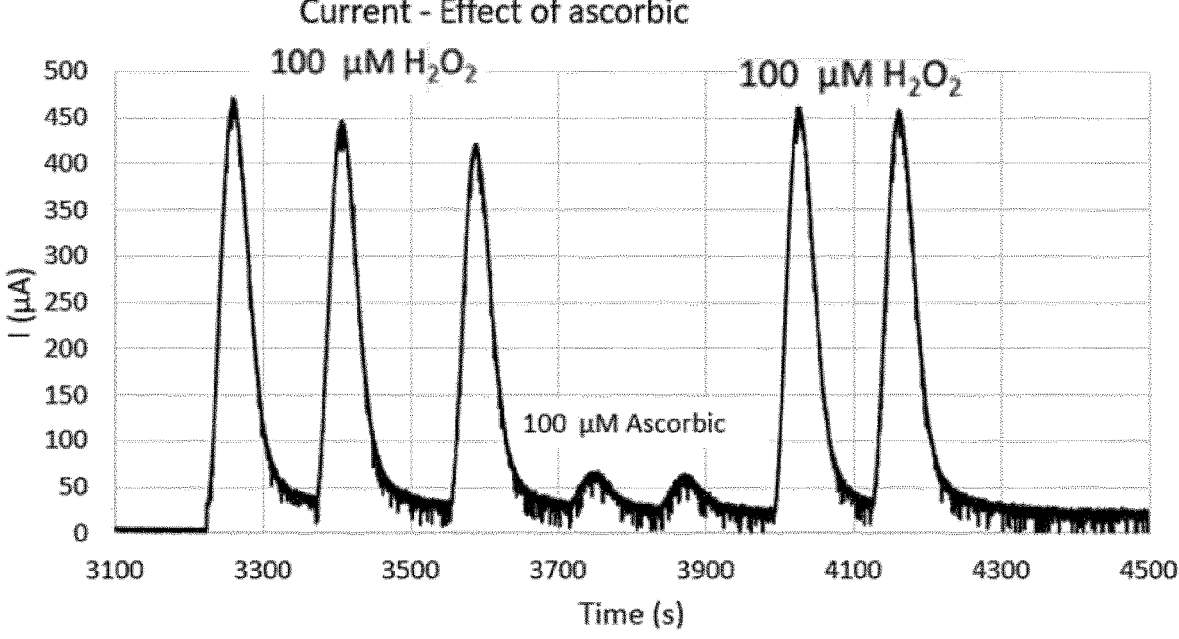
FIG. 11: Time trace of the sensor in FIG. 5 in a continuous flow mode with 100 μM of $H_2O_2$ and 100 μM of ascorbic acid.

Furthermore, the direct amperometric determination of hydrogen peroxide is complex and leads to the presence of serious interferences by redox-active species, such as ascorbic acid. The present invention offers remarkable advantages to overcome this problem. Since there is no applied external potential, the magnitude of the interference by redox active species, such as ascorbic acid, is minimized (particularly in the current based mode). When the system is operated in the continuous flow cell mode, the response to ascorbic acid is almost eliminated as seen in FIG. 11. This can be partly explained by the low difference of potential at which the electrodes are working. Also, in porous electrodes the structure of the concentration gradients plays a key role on the electrochemical response. Thus, this macroporous electrode creates a unique interface that enhance the response to peroxide and reduces the negative effect of interferences.

The present invention also proposes a new way to introduce the sample to the electrochemical cell by adding an aqueous solution by percolation through the front electrode. This approach provides several benefits:

a. Since only the front electrode is exposed, the whole area in contact with the sample is used to produce the electrochemical signal. That means lower sample volume required (or higher sensitivity for a given area).

b. The more compact setup facilitates miniaturization and is particularly useful in flow systems, such as wearable glucometers, since only one electrode is exposed in the flow cell.

c. Since counter and/or reference systems are protected through the polyelectrolyte, they are prone to less problems of unwanted reactions or changes in their chemical environment. This makes the system more stable and robust.

d. In drop analysis, the percolation of the sample through the pores breaks the surface tension, avoiding the formation of large drops. This improves the contact with the electrode surface facilitating chemical interactions. Also, since a thin layer of liquid is created, a diffusion of atmospheric oxygen is promoted, which may be beneficial for some chemical systems.

Therefore, a first aspect of the invention refers to an electrochemical sensor or cell suitable for determining the presence and/or the concentration of a target analyte in an aqueous solution, which comprises:

a front electrode comprising pores permeable to the aqueous solution and comprising a sensitive surface to the target analyte;

an electrolytic conductor bridge permeable to the aqueous solution; and a back electrode comprising at least a surface, preferably a sensitive surface, and optionally a support;

wherein the front electrode and the back electrode are electrically connected via the electrolytic conductor bridge; wherein the front electrode comprises pores above 0.2 μm of equivalent diameter, that connect the external surface of the front electrode and the electrolytic conductor bridge; wherein the electrochemical sensor is configured so that the aqueous solution enters in contact with the back electrode through the electrolytic conductor bridge, which in turn enters in contact with the aqueous solution through the pores of the front electrode; wherein the electrochemical sensor further comprises means for determining the difference in the electrochemical state between the front electrode and the back electrode; and wherein the determination of such difference in the electrochemical state indicates the target analyte presence and/or concentration in the aqueous solution.

The use of a macroporous electrode as the front electrode, provides surprising effects to the sensibility of the sensor to the target analyte as shown in Example 2. This is the result of a combination of consequences of the macropores. Firstly, as the aqueous solution percolates through the pores, the back electrode can be hidden from the aqueous solution maximizing the working electrode proportion of the exposed area. Secondly, in single volume and continuous flow analysis the percolation of the aqueous solution breaks the surface tension of the aqueous solution and the formation of large drops is avoided. This improves the contact with the electrode facilitating chemical interactions. Also, a diffusion of atmospheric oxygen is promoted, which may be beneficial for some chemical systems. In contrast with previously disclosed nanoporous electrodes, the present macroporous electrode allows full percolation of the aqueous solution through its surface and reach the electrolytic conductor bridge. Therefore, its function it's not related with the functionalization of the surface with redox mediators and/or electrocatalysts but with the permeability of such electrode to the aqueous solution containing the target analyte.

Although the front and the back electrodes are electrically connected via the electrolytic conductor bridge; this can be done in several configurations (vertically, laterally, in a non-linear way). It will be appreciated than any suitable configuration may be used as long as the two electrodes are connected via the electrolytic conductor bridge. In a similar way, the shape and size of the front and back electrodes may differ in several ways as long as the two electrodes are connected via the electrolytic conductor bridge. The electrolytic conductor bridge has a double function: it allows to close the electrical circuit between the electrodes and it further serves as the medium where the positive and negative charges of the electrodes are balanced.

It must be noted that the aqueous solution reaches the back electrode and the electrolytic conductor bridge only by percolating through the macropores of the front electrode. Therefore, the back electrode exposure to the aqueous solution is only indirect, in the sense that the aqueous solution containing the target analyte as presented to the electrode preferably won't reach the electrode, but an altered version of the aqueous solution will, as the reaching solution has necessary percolated through the front electrode and has already undergone through a redox reaction. In the case of the use of polyelectrolytes such as ionomers, it is well known that they present a permselective behaviour, i.e., act as barrier for negatively charged species. Also, they provide an enhanced proton conductivity and high solubility for oxygen, which may enhance some chemical reactions.

It must be noted that when the back-electrode surface is contacted by the aqueous solution it produces changes in the surface-aqueous solution interface that affect the electrochemical state of the electrode. Although the back electrode it's not directly exposed to the aqueous sample, it requires a suitable environment to generate the electrochemical interface so that the pertaining redox or reference reactions can take place and the sensor work as such. Therefore, the aqueous solution must always, although indirectly, reach the back electrode through the front electrode pores and the electrolytic conductor bridge nanopores to create a sensor using this configuration. This can be achieved, for example, at the beginning of the measurements by adding a small volume of electrolyte solution (e.g. a buffer solution) to the front electrode and allow for the stabilization. When the back electrode is dry, current flowing in the system is extremely low (<1 nA), but when a drop of background electrolyte solution (just buffer, no analyte) is added, the current increases and stabilizes. If the sensor dries up, the current drops again, and can be recovered in the same way as before. In the case of potential, if the sensor is dry the difference of potential (front-back) is very noisy and erratic. Once the sensor is wet, the noise is reduced and the potential stabilizes, usually around 20 mV. This is also evident from measuring the electrical conductivity between front and back electrode. When the sensor is dry, the conductivity is very low (high resistance). As the background solution is added, conductivity increases (liquid is necessary to allow for the chemical reactions and also for charge mobility in the ion bridge).

It must be also noted that the sensor can be also built as a system with 3 electrodes. In this case, the front electrode is exposed before the bridge to the aqueous solution, and the reference and counter electrode are shielded behind the electrolytic conductor bridge. There are several configurations to arrange these electrodes. For example, the back electrodes (reference and counter) could be stacked (one before the other one), in parallel, inserted in the electrolytic conductor bridge or behind it in the same plane or different planes. Other configurations not described herein are possible in this configuration when 3 electrodes are used.

FIG. 1A shows a schematic diagram of a electrochemical sensor 10 with a front electrode 11 comprising a porous sensitive surface 12, an electrolytic conductor bridge 14, a back electrode 16 and a means 18 for determining the difference in the electrochemical state between the front electrode 11 and the back electrode 16. The front electrode 12 is porous and allows an aqueous solution 122 to percolate through it and access the electrolytic conductor bridge 14. The means 18 is connected to the front electrode 11 and the back electrode 16 through a low resistance wire 182 that connects it with each electrode 11 and 16 so that it can determine the difference in their electrochemical state. The front electrode 11 and the back electrode 16 are connected through the electrolytic conductor bridge 14, which allows the solution 122 to indirectly reach the back electrode 16 from the macroporous front electrode 11. It must be noted that several means can achieve such effect, such as an ammeter or a voltmeter, as long as the difference in the electrochemical state between the front electrode and the back electrode can be determined. It must be also noted that additional electrical or electronic means can be added in the electric circuit to facilitate the measurements in any of the embodiments described herein.

In a preferred embodiment of the first aspect of the invention or of any of its preferred embodiments, the front electrode comprises a pore density configured to provide a Herzberg flow rate lower than 2500 s/100 mL.

In another preferred embodiment of the first aspect of the invention or of any of its preferred embodiments, the front electrode comprises pores preferably between 0.2 μm and 50 μm, more preferably between 1 μm and 25 μm, and even more preferably between 1.5 μm and 10 μm of equivalent diameter.

Electrochemical sensors can be classified by the type of means used to determine the difference in the electrochemical state between the front electrode and the back electrode; as different properties of the chemical reactions occurring at the electrodes can be exploited to determine the target analyte presence and/or concentration in the aqueous solution. Two common means used to determine the difference in the electrochemical state between two electrodes are ammeters, which measure the current flowing between the electrodes; and voltmeters, which measure the voltage between the electrodes. However other means as known in the art can be also used to measure current and potential between electrodes. Each means supposes different fields of electrochemical sensors with particular characteristics as observed below.

In a further preferred embodiment of the first aspect of the invention or of any of its preferred embodiments (from hereinafter referred as the "current-based embodiment"), the electrochemical sensor is a current-based sensor wherein the front electrode is the working electrode and the back electrode is the counter electrode; wherein the counter electrode carries out a complementary Faradaic reaction to the reaction carried out in the working electrode; and wherein the means for determining the difference in the electrochemical state is connected between the front electrode and the back electrode and configured to measure a current flowing between the front electrode and the back electrode. Such means might be an ammeter, a resistor, capacitor or any other electric or electronic means as well as combinations thereof.

The current-based sensor relies on the Faradaic (redox) reactions spontaneously occurring on the anode and cathode which makes electrons liberated into the anode reach the cathode through the ammeter, where the electrons are released into the back electrode medium balancing the redox equation from the anode.

Figure 2A:
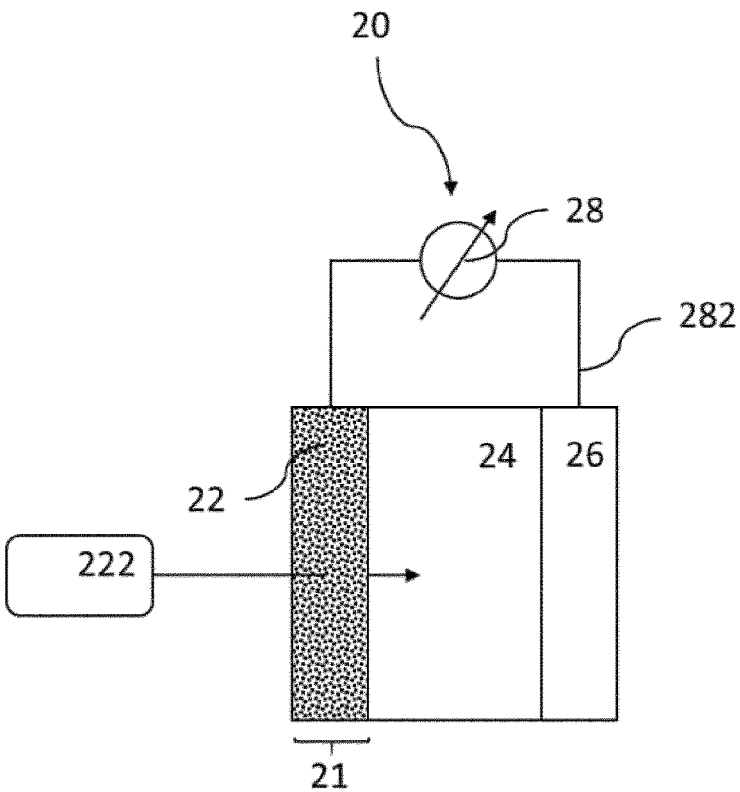
FIG. 2: Current-based sensor schematic view. a) Self-powered. b) Externally powered.

In a preferred embodiment of the current-based embodiment, the current-based sensor employs the energy generated at the interface of the front electrode when in contact with the aqueous solution to power the sensor. Therefore in this embodiment, the sensor works as what its known as a self-powered sensor, where "self-powered" refers to the fact that the sensor does not require the input of an external voltage to favour the redox reactions in the electrodes, but it is the energy generated at the interface of the front electrode the one that provides such voltage. FIG. 2A shows a schematic diagram of a self-powered current-based sensor 20 with a front electrode 21 comprising a porous sensitive surface 22, an electrolytic conductor bridge 24, a back electrode 26 and a ammeter 28 for determining the current flowing between the front electrode 21 and the back electrode 26. The front electrode 21 is porous and allows a fluid solution 222 to percolate through it and access the electrolytic conductor bridge 24. The ammeter 28 is connected to the front electrode 21 and the back electrode 26 through a low resistance wire 282 that connects it with each electrode 21 and 26 so that it can determine the current flowing between the electrodes 21 and 26 to flow. The circuit is closed through the electrolytic conductor bridge 24, which allows the current flow between the front electrode 22 and the back electrode 26 and the solution 222 to reach the back electrode 26 from the macroporous front electrode 21.

In an alternative preferred embodiment of the current-based embodiment, the current-based sensor further comprises a voltage source connected between the front electrode and the back electrode configured to apply a potential between the electrodes. Applying a potential that favours reactions at the electrodes (added to the one created by the (bio)chemical reactions) allows to further control the performance of the cell as shown in FIG. 4.

Figure 2B:
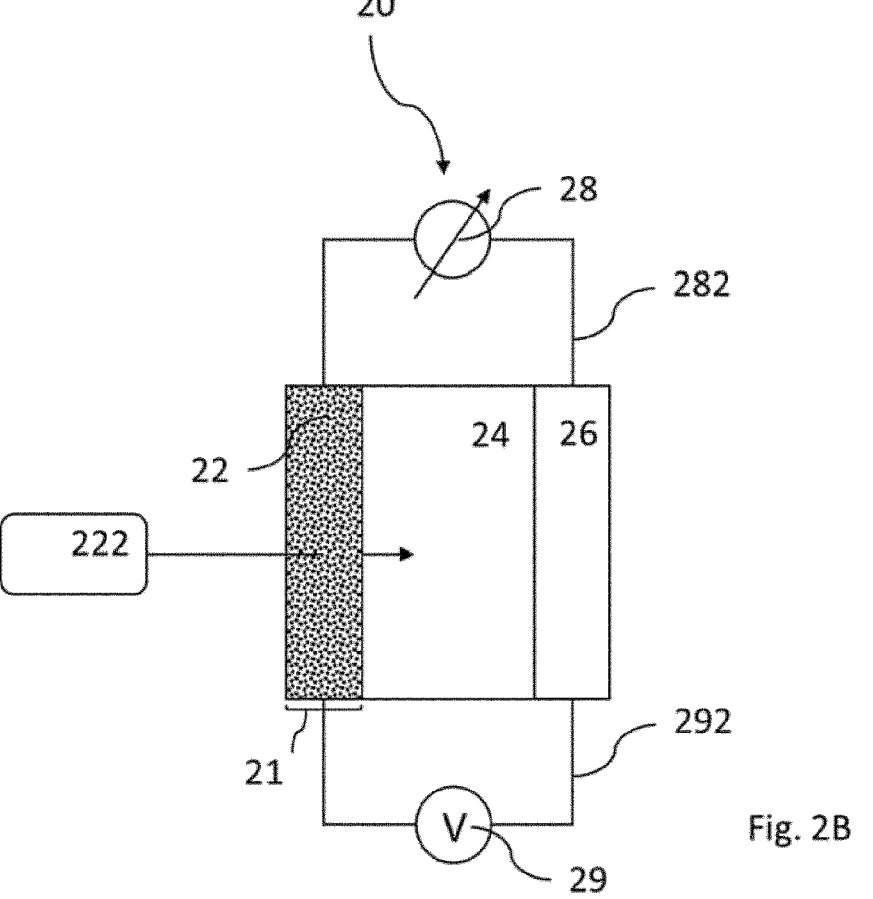

FIG. 2B shows a schematic diagram of a current-based sensor 20 with a porous front electrode 21 comprising a porous sensitive surface 22, an electrolytic conductor bridge 24, a back electrode 26 and an ammeter 28. The front electrode 21 is porous and allows a fluid solution 222 to percolate through it and access the electrolytic conductor bridge 24. The single-electrode 20 further comprises a voltage source 29 connected to the front electrode 21 and the back electrode 26 through a wire 292. The voltage source 29 favours reactions at the electrodes (the potential is added to the one from the biochemical reactions) and allows to control the performance of the cell. The voltage source 29 may comprise a mains power source, one or more batteries, a constant voltage or constant current power source or the like.

In another preferred embodiment of the current-based embodiment or of any of its preferred embodiments (from hereinafter referred as "hydrogen peroxide sensitive current-based embodiment"), the sensitive surface of the front porous electrode is a hydrogen peroxide sensitive surface and is selected from any of the following list consisting of: copper, nickel, Prussian blue-coated materials, Prussian blue-coated composites, palladium, palladium nanomaterials and platinum or platinum derivatives such as black platinum and platinum nanomaterials; so that the current-based sensor is configured to selectively measure hydrogen peroxide as the target analyte.

It is of special significance the importance of the front (anode) and back (cathode) electrodes materials of the hydrogen peroxide sensitive current-based sensor. Traditional amperometry relies on materials such as gold and carbon materials, which in this hydrogen peroxide sensitive current-based sensor system are not suitable as they don't catalyse the direct, spontaneous electron transfer reaction with peroxide. The working electrode seems to be strictly limited to hydrogen peroxide redox sensitive materials, while the counter electrode is less restrictive, as conducting polymers can also be used. It must be also noticed that, due to its particular design, there is the possibility of using two electrodes made of the same material without the need for different solutions, as the bridge and the porous front electrode ensure the environment of the hydrogen peroxide sensitive surface of the front electrode and the back electrode are different, allowing for the redox reaction to occur in a closed circuit. In such case, because of the different chemical interfaces, one of the electrodes acts as anode, and the other as cathode.

Such configuration is counter-intuitive in traditional amperometry as known in the art, as redox reactions need an electron donor (anode-oxidation) and an electron receiver (cathode-reduction) and for the same solution, a material will always be prone to either one of the two reactions under a certain potential, but having opposite reactions defies what traditional amperometry have always expected. The explanation for this previously unforeseen reaction relies on the different medium the back (not directly exposed) electrode is exposed to, when the sensing solution (the aqueous solution with the analyte to be measured) only enters into contact with the back electrode through the electrolytic conductor bridge, which captures the solution that percolates through the front (working) macroporous electrode. Specifically, the front electrode is exposed to a solution with hydrogen peroxide that its oxidized, and under certain concentration level, no hydrogen peroxide is able to reach the back electrode as it's quickly decomposed in the front electrode surface. Therefore, the percolated solution is different to the solution the front electrode is exposed to, allowing for an ORR (Oxygen Reduction Reaction) to spontaneously occur at the back electrode. However, this different configuration has been shown not to be compatible with some of the traditional materials for electrodes, such as Gold, and Carbon materials. Therefore, the selection of electrode materials is not a trivial decision. As a general rule, if peroxide produces electrochemical reactions with the electrode surface, it could be used as a working electrode, but the optimization of this system must be empirically found through a suitable combination of the back electrode.

It must be noted that any hydrogen peroxide sensitive surface of the front electrode, can be used to further detect by-products of reactions catalysed by oxidase enzymes, therefore detecting target analytes. Therefore, any of these embodiments must be also understood as applicable in such cases.

In a preferred embodiment of the hydrogen peroxide sensitive current-based embodiment, the electrolytic conductor bridge connecting the electrodes of the hydrogen peroxide sensitive current-based sensor is selected from any of the following list consisting of: a polyelectrolyte, a solid polymer electrolyte, an ionogel and a ionomer such as tetrafluoroethylene-perfluoro-3,6-dioxa-4-methyl-7-octene-sulfonic acid copolymer. It must be noted that in the current-based sensor, the electrolytic conductor bridge performs a very important function, as the positive charge at the working electrode must be balanced with the negative charge at the counter electrode. The electrolytic conductor bridge provides the medium for the balancing to happen and provides an aqueous medium to the back electrode.

In another preferred embodiment of the hydrogen peroxide sensitive current-based embodiment or of any of its preferred embodiments, the back electrode of the hydrogen peroxide sensitive current-based sensor comprises a conductive material selected from any of the following list consisting of: zinc, silver/silver chloride, conducting polymers such as PEDOT-PSS and platinum or platinum derivatives such as platinum-coated carbon materials and platinum nanomaterials, preferably platinum. It is important to note that suitable back electrodes are made with those materials that can efficiently produce the ORR (or an alternative reduction with solution components).

It is noted that any combination of the front electrode, electrolytic conductor bridge and back electrode lists is suitable and therefore can work in the current-based sensor. It must be further noted that the selection of the electrode depends on its ability to produce the complementary redox reactions and the working potential. Therefore, some combinations, although possible, are not the best choice for certain analytes. For example, Zn was tested as a back electrode with Pt as front electrode. However, the large difference of potential between both and the high efficiency of Zn for the ORR, creates a very large baseline current, which makes the detection not ideal, as shown in Example 1. The difference of potential is also important because of the nature of the reactions involved. Depending on the back electrode chosen, the front electrode might be forced to act as a cathode.

In another preferred embodiment of the hydrogen peroxide sensitive current-based embodiment or of any of its preferred embodiments, the hydrogen peroxide sensitive surface of the front electrode and the back electrode of the hydrogen peroxide sensitive current-based sensor comprise or are made of platinum.

In a further preferred embodiment of the hydrogen peroxide sensitive current-based embodiment or of any of its preferred embodiments, the hydrogen peroxide sensitive surface of the front electrode and the back electrode of the hydrogen peroxide sensitive current-based sensor comprise or are made of platinum and the electrolytic conductor bridge is made or composed of tetrafluoroethylene-perfluoro-3,6-dioxa-4-methyl-7-octenesulfonic acid copolymer.

It is noted that the use of a tetrafluoroethylene-perfluoro-3,6-dioxa-4-methyl-7-octenesulfonic acid copolymer is used to favour chemical reactions. It's use as the electrolytic conductor bridge allows: the water and ions transport through nanopores, creates high local acidity (due to protons in sulfonate groups) and high concentration of $O_2$ due to its higher solubility in this acid copolymer. Therefore, the use of a tetrafluoroethylene-perfluoro-3,6-dioxa-4-methyl-7-octenesulfonic acid copolymer as the electrolytic conductor bridge favours conditions for the ORR.

In an alternative further preferred embodiment of the first aspect of the invention or of any of its preferred embodiments (from hereinafter referred as "potential-based embodiment"), the electrochemical sensor is a potential-based sensor; wherein the front electrode is the working electrode and the back electrode is the reference electrode; wherein the reference electrode provides a stable potential; and wherein the means for determining the difference in the electrochemical state is connected between the front electrode and the back electrode and configured to measure the difference in voltage between the front electrode and the back electrode. Such means might be a voltmeter or any other electric or electronic means as well as combinations thereof.

In a preferred embodiment of the potential-based embodiment (from hereinafter referred as "hydrogen peroxide sensitive potential-based sensor"), the sensitive surface of the front porous electrode of the potential-based sensor is a hydrogen peroxide sensitive surface and its sensitive surface is selected from any of the following list consisting of: platinum, Prussian blue, zinc, copper and gold, preferably platinum; so that the potential-based sensor is configured to selectively measure hydrogen peroxide as the target analyte.

In a preferred embodiment of the hydrogen peroxide sensitive potential-based embodiment or of any of its preferred embodiments, the electrolytic conductor bridge connecting the electrodes of the hydrogen peroxide sensitive potential-based sensor is selected from any of the following list consisting of: a polyelectrolyte, a solid polymer electrolyte, an ionogel and a ionomer such as tetrafluoroethylene-perfluoro-3,6-dioxa-4-methyl-7-octenesulfonic acid copolymer.

In another preferred embodiment of the hydrogen peroxide sensitive potential-based embodiment or of any of its preferred embodiments, the reference electrode of the hydrogen peroxide sensitive potential-based sensor comprises a conductive material selected from any of the following list consisting of: silver, platinum, gold, nickel, zinc, copper, silver/silver chloride, conducting polymers such as PEDOT-PSS, aluminium and carbon.

It is noted that any combination of the front electrode, electrolytic conductor bridge and back electrode material lists is suitable and therefore can work in the potential-based sensor. It must be further noted that the selection of the electrode depends on its ability to produce the complementary redox reactions and the working potential. Therefore, some combinations, although possible, are not the best choice.

In another preferred embodiment of the hydrogen peroxide sensitive potential-based embodiment or of any of its preferred embodiments, the hydrogen peroxide sensitive surface of the front electrode and the reference electrode of the hydrogen peroxide sensitive potential-based sensor comprise or are made of gold or platinum.

In another preferred embodiment the hydrogen peroxide sensitive potential-based embodiment or of any of its preferred embodiments, the hydrogen peroxide sensitive surface of the front electrode and the reference electrode of the hydrogen peroxide sensitive potential-based sensor comprise or are made of gold or platinum and the electrolytic conductor bridge is made of composed of tetrafluoroethylene-perfluoro-3,6-dioxa-4-methyl-7-octenesulfonic acid copolymer.

As in the current-based sensor, the use of a tetrafluoroethylene-perfluoro-3,6-dioxa-4-methyl-7-octenesulfonic acid copolymer is used to favour chemical reactions. It's use as the electrolytic conductor bridge allows: the water and ions transport through nanopores, creates high local acidity (due to protons in sulfonate groups) and high concentration of $O_2$ due to its higher solubility in this acid copolymer. Therefore, the use of a tetrafluoroethylene-perfluoro-3,6-dioxa-4-methyl-7-octenesulfonic acid copolymer as the electrolytic conductor bridge favours conditions for the ORR.

In another preferred embodiment of the first aspect of the invention or of any of its preferred embodiments, the front electrode and/or the back electrode further comprise a support which in turn comprises a conductive material. It is noted that such support may be formed by plastic, paper, rubber, textile, composites, and combinations of any material, as long as it serves as a supporting element for the electrodes can be used to practice the present invention. In the case of the front electrode, due to its macro-porosity requirements, the support material must ensure the properties arisen from this macro-porosity are not limited, for example the support material must still be porous to the extent that the aqueous solution can still percolate through it. In a similar way, the support shouldn't impede the process of the chemical reactions occurring at the electrodes, but it could serve as a catalyser of such; and electrical conductivity must not be affected by these supports. For example, the ionomer tetrafluoroethylene-perfluoro-3,6-dioxa-4-methyl-7-octenesulfonic acid copolymer enhances the oxygen reduction reaction in platinum, so a support could be formed by soaking a paper with this ionomer.

Figure 1B:
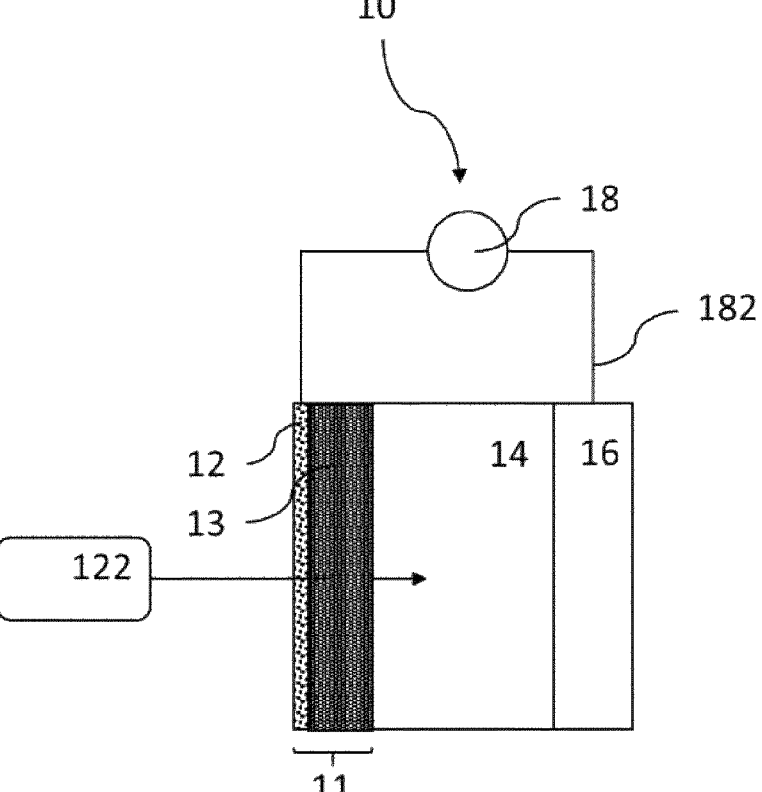

FIG. 1B shows a schematic diagram of a electrochemical sensor 10 with a front electrode 11 comprising a porous sensitive surface 12 and a support 13, an electrolytic conductor bridge 14, a back electrode 16 and a means 18 for determining the difference in the electrochemical state between the front electrode and the back electrode. The support 13 allows the aqueous solution 122 to percolate through it and does not hinder the electrochemical reactions occurring at the porous sensitive surface. It must be noted, that, although not explicitly shown in this diagram, the back electrode could also have a support, and that the opposite configuration where only the back electrode has a support is also possible.

In another preferred embodiment of the first aspect of the invention or of any of its preferred embodiments, the front porous, the electrolytic conductor bridge and the back electrode of the electrochemical sensor are configured so that these are stacked, and preferably they are vertically stacked.

In another preferred embodiment of the first aspect of the invention or of any of its preferred embodiments, the front porous, the electrolytic conductor bridge and the back electrode of the electrochemical sensor are configured so that these are stacked, and preferably they are vertically stacked and more preferably the front electrode is directly above the back electrode.

It is noted that the front porous, electrolytic conductor bridge and back electrode can be stacked in several configurations (vertically, laterally, in a non-linear way). It must be further noticed that the front electrode may be directly above the back electrode or vice versa, so that the gravity and/or capillarity can be used to facilitate the percolation of the aqueous solution. It will be appreciated than any suitable configuration may be used as long as the aqueous solution can reach the back electrode when contacted with the front porous electrode, and that gravity is not a limiting factor as the capillarity of the electrodes and/or the conductor bridge and the flow velocity of the aqueous solution can achieve this without the need of gravity.

In another preferred embodiment of the first aspect of the invention or of any of its preferred embodiments, the electrochemical sensor is covered so that when immersed, only the front electrode is exposed to the aqueous solution to be tested. It is noted that several materials and strategies can be used to adapt the electrochemical sensor so that only the front electrode is directly reachable by the aqueous solution. Materials like rubber, plastic, metal and other impermeable materials can be used to create a casing that protects all the electrochemical sensor from the exterior, and a small aperture on the casing would provide access to the front electrode. Therefore, when the electrochemical sensor is contacted with the aqueous solution, only the front electrode would be directly reached by it, although the back electrode would be indirectly reached by the aqueous solution previously percolated through the porous front electrode and the electrolytic conductor bridge.

In another preferred embodiment of the first aspect of the invention or of any of its preferred embodiments, the electrolytic conductor bridge connecting the electrodes of the electrochemical sensor is selected from any of the following list consisting of: a polyelectrolyte, a solid polymer electrolyte, an ionogel and a ionomer such as tetrafluoroethylene-perfluoro-3,6-dioxa-4-methyl-7-octenesulfonic acid copolymer. It is noted that the electrolytic conductor bridge can be made from other materials that can be an ionically connective media that provide ionic electrical conductivity and water permeability.

In another preferred embodiment of the first aspect of the invention or of any of its preferred embodiments, the front electrode of the electrochemical sensor is coated with tetrafluoroethylene-perfluoro-3,6-dioxa-4-methyl-7-octene-sulfonic acid copolymer. It is noted that in the case of the current-based sensor, the use of coatings (such as tetrafluoroethylene-perfluoro-3,6-dioxa-4-methyl-7-octenesulfonic acid copolymer) may reduce the sensitivity. However, the role of tetrafluoroethylene-perfluoro-3,6-dioxa-4-methyl-7-octenesulfonic acid copolymer is also to contain and limit the flow of electrolyte due to capillarity of the support. Therefore, tetrafluoroethylene-perfluoro-3,6-dioxa-4-methyl-7-octenesulfonic acid copolymer is useful to control the baseline and stability of the response.

FIG. 3 shows a schematic diagram of a potential-based sensor 30 with a front electrode 31 comprising a porous sensitive surface 32 coated with coating 324, an electrolytic conductor bridge 34, a back electrode 36 and a voltmeter 38 for determining the potential between the front electrode 31 and the back electrode 36. The front electrode 31 is porous and allows a fluid solution 322 to percolate through it and access the electrolytic conductor bridge 34. The voltmeter 38 is connected to the front electrode 31 and the back electrode 36 through a low resistance wire 382 that connects it with each electrode 31 and 36 so that it can determine the potential between the electrodes 31 and 36 to flow.

The coating 324 may reduce the sensitivity. However, its role is also to contain and limit the flow of electrolytes due to capillarity of the electrolytic conductor bridge 34. Therefore, is useful to control the baseline and stability of the response. It must be noted that in some embodiments, the coating might be applied on the whole front electrode 31 surface, while in other embodiments, the front electrode 31 can be partially coated to provide a desired response. Also note that although in FIG. 3 only the frontside of the front electrode 31 is coated, in other embodiments the coating 324 can be also applied on other exposed areas of the front electrode 31, such as the sides. A casing 302 ensures that the electrolytic conductor bridge 34 and the back electrode 36 are not exposed to the fluid solution 322. The casing may be formed by any means that has waterproof features, so that the fluid solution 322 can only reach the electrolytic conductor bridge 34 and the back electrode 36 through the porous front electrode 31.

In another preferred embodiment of the first aspect of the invention or of any of its preferred embodiments, the front electrode and the back electrode of the electrochemical sensor are made of the same material, preferably platinum. It is again noted that using two electrodes made of the same material without the need for different solutions it's not trivial as electrochemical sensors need different environments on each half-cell to ensure there is a different electrochemical state in each electrode, so that the presence and/or concentration of the target analyte can be determined. Once again, this is possible as the electrolytic conductor bridge ensures the environment of the hydrogen peroxide sensitive surface of the front electrode and the back electrode are different.

In a preferred embodiment of the hydrogen peroxide sensitive embodiments or of any of their preferred embodiments (from hereinafter referred as "first functionalised embodiment"), the front electrode of any of the hydrogen-peroxide sensitive sensors (current-based or potential-based) is functionalized with an oxidase or dehydrogenase enzyme selected from the group consisting of glucose oxidase, glucose dehydrogenase, cholesterol oxidase, cholesterol dehydrogenase, lactate oxidase, lactate dehydrogenase, bilirubin oxidase, bilirubin dehydrogenase, amino acids oxidase and amino acids dehydrogenase; configured to produce hydrogen peroxide when in contact with the target analyte that the electrochemical sensor measures. It is noted that this allows the sensor to be used, for example, to selectively and directly determine the concentration of hydrogen peroxide in any type of industrial, natural or biological fluid. A biological fluid may preferably be undiluted whole blood, intracellular fluids, saliva blood sera and urine or any suitable buffer or problem solution. In particular, said selective and direct determination of the concentration of hydrogen peroxide in an aqueous solution in turn determines the presence and/or concentration of glucose, galactose, cholesterol, uric acid, lactic acid and amino acids in said solution.

In another preferred embodiment of the hydrogen peroxide sensitive embodiments or of any of their preferred embodiments (from hereinafter referred as "second functionalised embodiment"), a sensor system comprises the hydrogen-peroxide sensitive sensor (current-based or potential-based), and the electrochemical sensor (preferably the front electrode) is functionalised with a capture entity that directly captures the target analyte or indirectly captures the target analyte through another capture entity which is capable of targeting the analyte and is labelled with a molecule capable of binding the capture entity functionalizing the electrochemical sensor.

It is noted that the capture entity may be any entity, such as an antibody, antigen, antibody-like entity, nucleic acids (DNAs, RNAs and their different forms), biotin, streptavidin or the like, that directly or indirectly captures the target analyte.

In a preferred embodiment of the second functionalised embodiment, the system further comprises means for detecting the target analyte wherein said means are at least a detection entity and a substrate and wherein said detection entity is capable of detecting the target analyte and is labelled with an enzyme capable of producing hydrogen peroxide when exposed to the substrate. It is noted that this allows the sensor to be further used, for example, to selectively and directly label biomolecules. The detection entity may be any entity, such as an antibody, antigen or antibody-like entity that further comprises a detection molecule such as an enzyme or any label that, when exposed to a substrate that is its precursor, produces a reaction whose products can be detected.

A second aspect of the present invention refers to a method of determining the presence and/or concentration of a target analyte in an aqueous solution, the method comprising:

a. contacting the aqueous solution with the sensitive surface of the front electrode of the first aspect of the invention or of any of its preferred embodiments;

b. determining the difference in the electrochemical state between the front electrode and the back electrode; and c. determining the presence and/or concentration of the analyte in the aqueous solution based on the difference in the electrochemical state.

It must be noted that the aqueous solution does not necessarily need to percolate to the back electrode in order for any of the methods of the second aspect of the invention to work; but if the sensor is already wet by a supporting electrolyte (background ionic solution), it is enough for the aqueous solution to reach the electrolytic conductor bridge and close the electrical circuit.

In a preferred alternative embodiment of the second aspect of the invention or of any of its alternative embodiments of any of their preferred embodiments, before the sensitive surface of the front electrode of the sensor is contacted with the aqueous solution, it is previously contacted with a background ionic solution that saturates the electrolytic conductor bridge and back electrode. The background ionic solution may be the same aqueous solution as the one under test or any other buffer or solution. It must be noted that this embodiment is extensive to all of the possible embodiments of the second aspect of the invention including those wherein the sensor is functionalised in any way.

In a preferred embodiment of this second aspect of the invention, the aqueous solution is a biological fluid previously obtained from a subject, preferably a mammal, more preferably from a human being. The sample such as blood is preferably undiluted whole blood, intracellular fluids, saliva blood sera and urine or any suitable buffer or problem solution. Said selective and direct determination of the presence and/or concentration of an analyte in the aqueous solution is based on the difference in the electrochemical state produced by the presence of said analyte in the working electrode of the electrochemical sensor.

In a further preferred embodiment of this second aspect of the invention or of any of its preferred embodiments, said biological sample is a blood, plasma or serum sample isolated from a subject, preferably a mammal, more preferably from a human being. The determination of presence and/or concentration of hydrogen peroxide further determines the presence and/or concentration of the precursors of the hydrogen peroxide in the biological sample. This can allow to detect reactive oxygen species (ROS) in some metabolic disorders and cancer, or in case an enzymatic or labelled reaction is carried out separately; or in an automated flow system, etc. the sensor can be used simply to the detect the presence of peroxide.

An alternative embodiment of the second aspect of the invention refers to a method of determining the presence and/or concentration of a target analyte in an aqueous solution through the measurement of hydrogen peroxide, the method comprising:

a. contacting the aqueous solution with the sensitive surface of the front electrode of the first functionalised embodiment of the first aspect of the invention;

b. determining the difference in the electrochemical state between the front electrode and the back electrode;

c. determining the presence and/or concentration of the hydrogen peroxide in the aqueous solution based on the difference in the electrochemical state; and d. determining the presence and/or concentration of the target analyte in the aqueous solution based on the determined concentration of hydrogen peroxide.

In a preferred embodiment of this alternative embodiment of the second aspect of the invention, the electrochemical sensor for selectively measuring a target analyte in an aqueous solution is used in an aqueous solution which is any type of industrial, natural or biological fluid. Biological fluids may be previously obtained from a subject, preferably a mammal, more preferably from a human being. A biological fluid may preferably be undiluted whole blood, intracellular fluids, saliva blood sera and urine or any suitable buffer or problem solution comprising any of these. Said selective and direct determination of the concentration of hydrogen peroxide in an aqueous solution in turn determines the presence and/or concentration of glucose, galactose, cholesterol, uric acid, lactic acid, bilirubin or amino acid in said solution as well as any other analytes present in said solution as known in the art.

In a further preferred embodiment of this alternative embodiment of the second aspect of the invention or of any of its preferred embodiments, said biological sample is a blood, plasma, serum sample or any other sample isolated from a subject, preferably a mammal, more preferably from a human being; or a buffer wherein said sample is contained.

A further alternative embodiment of the second aspect of the invention refers to method for determining the presence and or concentration of a target analyte in an aqueous solution wherein the method comprises:

a. contacting the aqueous solution with the sensitive surface of the front electrode of an electrochemical sensor as defined in any of the second functionalised embodiments of the first aspect of the invention so that the capture entity binds directly or indirectly to the target analyte if present;

b. contacting the sensitive surface of the front electrode of the electrochemical sensor of step a) with a detection entity so that the detection entity binds to the target analyte if present;

c. optionally rinsing the sensitive surface; and adding the substrate so as to produce hydrogen peroxide if the labelled detection entity is present;

d. determining the difference in the electrochemical state between the front electrode and the back electrode; and e. determining the presence and/or concentration of the target analyte in the aqueous solution based on the difference in the electrochemical state.

Another further alternative embodiment of this second aspect of the invention refers to method for determining the presence and or concentration of a target analyte in an aqueous solution wherein the method comprises:

a. contacting the aqueous solution with the sensitive surface of the front electrode of an electrochemical sensor as defined in any of the second functionalised embodiments of the first aspect of the invention so that the capture entity binds directly or indirectly to the target analyte if present;

b. contacting the sensitive surface of the front electrode of the electrochemical sensor of step a) with the detection entity so that the detection entity binds to the target analyte if present;

c. optionally rinsing the sensitive surface; and adding the substrate so as to produce hydrogen peroxide if the labelled detection entity is present;

d. determining the difference in the electrochemical state between the front electrode and the back electrode; and e. determining the presence and/or concentration of the hydrogen peroxide in the aqueous solution based on the difference in the electrochemical state; and f. determining the presence and/or concentration of the target analyte in the aqueous solution based on the determined concentration of hydrogen peroxide.

In a preferred embodiment of any of these further alternatives of the second aspect of the invention, the method is part of a method based on labelling nucleic acids, such as genosensor using enzyme labelled DNA or RNA (in any of their forms) and in any labelled assay producing hydrogen peroxide including enzyme-labelled immunoassays as enzyme linked immunosorbent assay (ELISA), blot methods including dot, northern, southern and western blot, lateral flow tests and glucose oxidase (GOx) labelled methods, as well as other related technique as known in the art; wherein a hydrogen peroxide releasing enzyme, such as oxidase or dehydrogenase are employed. Therefore, spectroscopic detection methods could be substituted by an electrochemical detection method using a sensor as described in the first aspect of the invention. For example, a particular analyte (such as glucose) is tagged with an antibody that contains magnetic nanoparticles that are attracted to the working electrode, and furthermore with another antibody with one of these enzymes (such as glucose oxidase). Then the solution with the tagged analyte would be exposed to the electrochemical sensor and under an aqueous solution, the enzyme would liberate hydrogen peroxide which the electrochemical sensor can detect to determine its presence and/or concentration. Example 4 shows the use of this method in an ELISA for IgG based on GOx labelled antibodies. FIG. 12 shows a time-trace potential reading of a single electrode after the immunoreaction and the GOx-labelled antibody.

ELISAs, according to the present invention, are typically performed in 96-well (or 384-well) polystyrene plates, which will passively bind the at least one protein or fragments thereof. The binding and immobilization of reagents makes ELISAs simple to design and perform. Having the reactants of the ELISA immobilized to the microplate surface enables easy separation of bound from non-bound material during the assay. This ability to wash away non-specifically bound materials makes the ELISA a powerful tool for measuring specific analytes within a crude preparation. The sensor system when in use for ELISA comprises optionally one or more of the following preparation reagents: blocking reagents for unbound sites to prevent false positive results; anti-(species) IgG, IgM and/or IgA conjugated to a label, preferably an enzyme; and substrates that react with the label, preferably the enzyme, to indicate a positive reaction. In addition to the procedure reagents, additional reagents such as wash buffers, stop solutions and stabilizers can enhance the quality of the ELISA assay.

In still another preferred embodiment of any of these further alternative second aspect of the invention or of any of its preferred embodiments, said method is an in vitro diagnostic method for the detection of a virus or bacteria or the presence of antibodies against a virus in a subject, wherein said subject is preferably a mammal, more preferably a human being, and wherein said subject is diagnosed as having antibodies against the virus if an antigen-antibody complex between said virus protein or said fragment and an antibody present in said biological sample is detected.

In still another preferred embodiment of any of these further alternative second aspects of the invention or of any of its preferred embodiments, said method is an in vitro method for screening individuals having antibodies against the virus from those not having antibodies against the virus.

In a preferred embodiment of any of the second aspect of the invention or of any of its preferred embodiments (from hereinafter referred as "immersed method"), the aqueous solution is contacted to the front electrode of the electrochemical sensor by immersing the sensor in the solution. It is noted that, in this use the amount of solution put in contact with the front electrode so that said solution percolates to the back electrode. It is further noted that, the sensor may be immersed in many different positions, with the exposed front electrodes facing upwards, downwards or laterally, and in that any case the electrolytic conductor bridge and the back electrode are completely isolated from the solution and can only get in touch with the solution percolated through the front electrode.

In a preferred embodiment of the immersed method, the aqueous solution is obtained through a needle previously inserted in a subject, preferably a mammal, more preferably in a human being; and analysed within it. The sample of the aqueous solution such as blood is preferably undiluted whole blood, preferably undiluted whole blood, intracellular fluids, saliva blood sera and urine or any suitable buffer or problem solution. Said selective and direct determination of the concentration of hydrogen peroxide in an aqueous solution in turn determines the presence and/or concentration of glucose, galactose, cholesterol, uric acid, lactic acid, bilirubin or amino acid in said solution as well as any other analytes present in said solution as known in the art.

Figure 8:
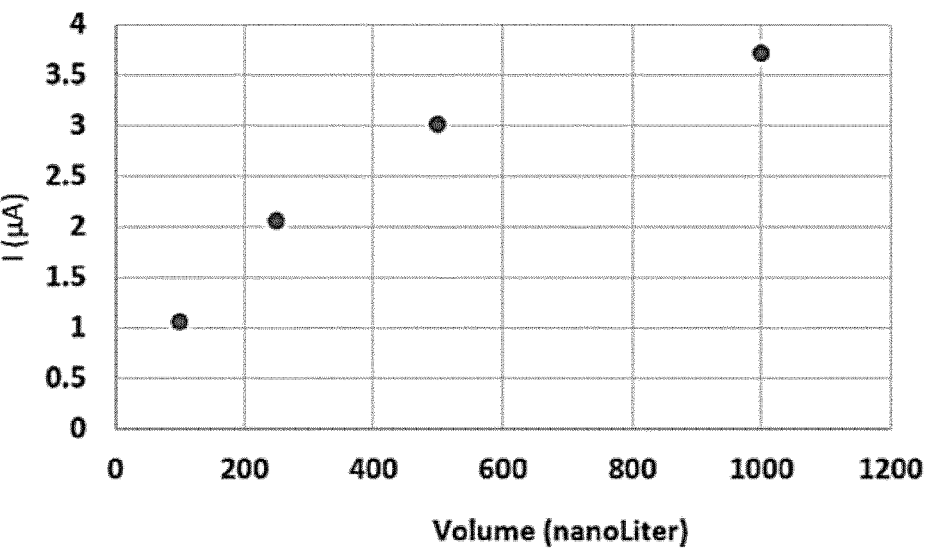
FIG. 8: Current signal for different injected volumes of the sensor in FIG. 5.

In a preferred alternative embodiment of any of the second aspect of the invention or of any of its preferred embodiments (from hereinafter referred as "single volume method"), the aqueous solution is contacted to the front electrode of the electrochemical sensor by adding a single volume of the solution to the sensor. Said volume may be a single drop, two drops or any number of drops so that a minimum current can be registered of the solution. It is noted that, in this method the amount of solution in contact with the front electrode is such that a response is generated. If the sensor is dry, the amount must sufficient so that said solution percolates to the back electrode. On the other hand, if the sensor has been previously exposed to a supporting electrolyte and this has percolated and reached the back electrode providing a stable current, a smaller amount of problem solution in the nL scale can be used, as shown in FIG. 8.

It is further noted that, the sensor may be in many different positions, with the exposed front electrodes facing upwards, laterally or even downwards, and in that any case the electrolytic conductor bridge and the back electrode are completely isolated from the aqueous solution and can only get in touch with the solution percolated through the front electrode. It is particularly important to highlight that this method, according to the present configuration, allows detection in reduced volumes as shown in FIG. 7. The method is preferably performed in a single drop, where at least 100 nL of peroxide is content in the solution. Noteworthy further reduction of volume down to the nL scale is possible based on the geometry optimization. The current signal obtained for different injected volumes can be seen in FIG. 7. In a similar way, the response of the system to these small amounts can be in the 100-millisecond time scale, is possible based on the geometry optimization. Furthermore, there are no interference due to ascorbic acid in when using this configuration.

In a preferred embodiment of the single volume method, a single drop or several drops of an aqueous solution obtained through a needle previously inserted in a subject, preferably a mammal, more preferably in a human being is exposed to the electrochemical sensor. The sample such as blood is preferably undiluted whole blood, intracellular fluids, saliva blood sera and urine or any suitable buffer or problem solution. Said selective and direct determination of the concentration of hydrogen peroxide in an aqueous solution in turn determines the presence and/or concentration of glucose, galactose, cholesterol, uric acid, lactic acid, bilirubin or amino acid in said solution as well as any other analytes present in said solution as known in the art.

In another preferred alternative embodiment of any of the second aspect of the invention or of any of its preferred embodiments (from hereinafter referred as "continuous flow method"), the aqueous solution is contacted to the front electrode of the electrochemical sensor by exposing the sensor to a continuous flow of the solution. It is noted that, in this method the amount of solution required to be in contact with the front electrode is reduced as long as the there is an initial supporting electrolyte that percolates to the back electrode. This is because when the sensor is already saturated in a buffer, the circuit is closed through contact with the electrolyte solution. Therefore, in the continuous flow method the aqueous solution may first percolate the front electrode and reach the back electrode if the sensor is dry. From thereon, a smaller amount would be needed. Alternatively, the sensor may be previously saturated with an electrolyte solution that closes the circuit, and the aqueous problem solution only need to be in contact with the front electrode for the sensor to work.

It is further noted that, the sensor may be in many different positions, with the exposed front electrodes facing upwards, laterally or even downwards, and in that any case the electrolytic conductor bridge and the back electrode are completely isolated from the aqueous solution and can only get in touch with the solution percolated through the front electrode. It has been shown that unlike the immersed method, wherein typical sensitivities in the order of 40 mV/decade; in this continuous flow method sensitivities in the order to 150 mV/decade are obtained (see FIG. 10) and the sensor is not affected by the ascorbic interference as shown in FIG. 11.

For the detection of the presence and/or concentration of hydrogen peroxide, and the indirect detection target analytes (biomolecules), wherein peroxide can be obtained through a reaction catalysed by oxidase enzymes, the method is preferably performed in continuous flow of buffer solution, where at least peroxide with 1 μM concentration is content in the solution. Noteworthy further reduction of volume down to the nL scale is possible based on the geometry optimization. In a similar way, the response of the system to these small amounts can be in the 100-millisecond time scale, is possible based on the geometry optimization. Results are comparable to those in already disclosed two-electrode self-powered sensors. Furthermore, there are no interferences due to ascorbic acid in when using this configuration.

In a preferred embodiment of the continuous flow method, the front electrode is introduced into a subject, preferably a mammal, more preferably a human being. Said selective and direct determination of the concentration of hydrogen peroxide in an aqueous solution in turn determines the presence and/or concentration of glucose, galactose, cholesterol, uric acid, lactic acid, bilirubin or amino acid in said solution as well as any other analytes present in said solution as known in the art. The continuous flow method can allow for real-time measurements of presence and/or concentration of said metabolites in the user. In particular, the use of the continuous flow method can allow for real-time continuous measurements of the presence and/or concentration of said metabolites in the user. A use of this method for a glucose self-powered sensor using the continuous flow method can be seen in Example 3.

In another preferred embodiment of the continuous flow method or of any of its preferred embodiments, the electrochemical sensor for selectively measuring a target analyte in an aqueous solution is used in an organic electrochemical transistor. The macroporous electrode is layered on top of the transistor's channel and can be used as a gate. In a further preferred embodiment of the continuous flow method in an organic electrochemical transistor, the transistor is part of a glucose sensor wherein upon the detection of glucose, the transistor changes its state and allows for a further change of state of the system the transistor forms part of, and perform other actions, such as providing an insulin shot.

In a still further preferred embodiment of the continuous flow method or of any of its preferred embodiments, the electrochemical sensor is sensitive to glucose and is part of an organic electrochemical transistor or a glucometer, wherein the front electrode is introduced into a subject, preferably a mammal, more preferably a human being. Said selective and direct determination of the concentration of hydrogen peroxide in an aqueous solution in turn determines the presence and/or concentration of glucose. In this embodiment the detection of glucose can be performed in real-time and continuously.

In preferred embodiment of the second aspect of the invention or of any of its preferred embodiments, the porous sensitive surface of the front electrode support is formed by sputtering an electroactive material and/or applying nanoparticles of the electroactive material over the front electrode support. It is of importance that the electroactive materials remain thin, so that it doesn't affect the micron size pores of the paper. Also, other forms of depositing small layers of the electroactive material such as electrodeposition, drop-casting, conductive inks, composites and other as known in the art that allow the percolation of the aqueous solution can be used.

It must be noted that the direct detection of peroxide is complex. The materials that can be used have to be operated at a working potential that makes the susceptible of serious interferences by redox-active species, such as ascorbic acid. In this respect the present invention offers remarkable advantages. When the sensor is immersed the typical interference of ascorbic acid affects the performance. Nevertheless, when the system is operated in the open flow cell mode, the response to ascorbic acid is almost eliminated. FIG. 11 compares the response of a 100 μM peroxide solution and 100 μM ascorbic acid. This is the maximum level normally found in blood, and it is used to evaluate the interference of this substance. In a conventional system, this interference will seriously affect the electrode response. In this case, the interference is negligible.

This can be partly explained by the low difference of potential at which the electrodes are working. Also, in porous electrodes the structure of the concentration gradients plays a key role on the electrochemical response. In this case, when the working electrode is exposed to air, the electrochemical interface becomes a complex system where the interplay of a thin layer of liquid, air, hydrated cellulose and the metal are involved. Thus, this macroporous electrode creates a unique interface that enhance the response to peroxide and reduces the negative effect of interferences.

The following examples merely illustrate the present invention and do not limit the same.

EXAMPLES

Materials and Methods

In this invention, a new cell geometry using metal-sputtered papers in working and reference electrodes, and a Nafion® membrane as a conductive media, is applied in the construction of a paper-based electrochemical all-solid-state sensor for hydrogen peroxide detection, i.e. the biomarker of the oxidase enzyme reaction as well as, for glucose as a model biomarker. Nafion® is a commercial product of the ionomer tetrafluoroethylene-perfluoro-3,6-dioxa-4-methyl-7-octenesulfonic acid copolymer.

Experimental Section

Reagents. Nafion® 117 solution (10% in a mixture of lower aliphatic alcohols and water); glucose oxidase (GOx) (from Aspergillus niger type X-S, lyophilized powder (100, 000-250.000 units/g) D-glucose); hydrogen peroxide (30 wt. % in water) and D-Glucose (Glu) were purchased from Sigma-Aldrich. Phosphate buffer saline (PBS) pH=7.4 (0.1 M NaCl, 0.003 M KCl, 0.1 M $Na_2HPO_4$, 0.02 M $K_2HPO_4$) were prepared using 18.2 M$\Omega$ cm$-1$ double deionized water (Milli-Q water systems, Merck Millipore). IgG, Anti (IgG) and Anti (IgG) GOx labelled were purchased from Abcam (UK).

Sputtered platinum paper. Whatman® Grade 5 qualitative filter paper circles were coated with Pt using a radiofrequency sputtering process (ATC Orion 8-HV, AJA International) operated at 3 mTorr, for 65 s at 200 W.

Figure 5:
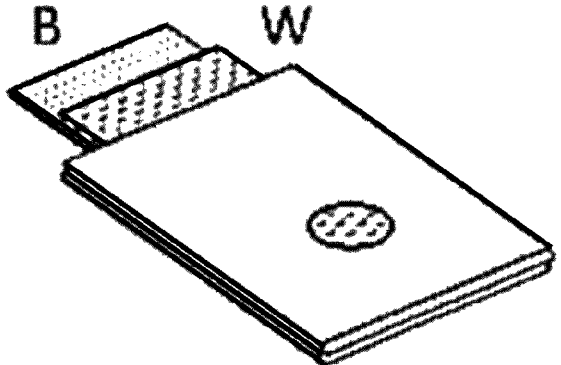
FIG. 5: Current-based self-powered single-electrode sensor for hydrogen peroxide detection configuration as used in the examples.

Paper sensor construction (FIG. 5). Two conductive paper strips are used, namely: the front (upper) strip (made with a conductive material-sputtered paper) acts as WE (working electrode); the back (lower) strip is a conducting paper that acts as reference electrode (RE). WE and RE are glued using a drop of Nafion® 10% (sandwiched between the plastic masks). An orifice on the upper plastic mask leaves exposed the electrochemically active area of the front electrode.

Typically, the radius of this circular window is 1.5 mm. Finally, a drop of Nafion® 5% is located over the electrochemically active window, covering the exposed area of the WE. In all cases the conductive paper strips were cut with a width of 0.4 cm.

Results

Example 1: Determination of Best Electrode Material

FIG. 4 shows a table summarizing the performance results from different configuration. In the conventional amperometric cell configuration, seven types of electrode materials configurations were tested. It must be noted, that under this configuration, the present electrode was not in use, but a conventional setup was employed for the solely purpose of determining each material performance. It also must be noted that performance values under this configuration are intended to show proof of principle, since different experimental conditions (electrode size, supporting electrolyte, etc) may yield different performance.

It was shown that as there is a response when measuring hydrogen peroxide directly with platinum electrodes, even when using commercial screen-printed Pt electrodes either as working or counter, so it is not just something unique of paper-based electrodes. Also, it was proven that Au is not a suitable material for electrodes in this configuration as none of the systems provided a response. Silver electrode gets clearly worn out, and zinc creates a very large baseline current, that makes difficult to control de system. Finally, CNT electrodes do not provide a response. It was therefore shown that it is possible to use Pt for the direct (i.e., no redox mediators), self-powered electrochemical detection of hydrogen peroxide in solution. Also, common materials in amperometric sensors are not suitable for this configuration.

Example 2: Hydrogen Peroxide Detection in Solution, in Drop and in Continuous Flow To analyse the detection of hydrogen peroxide detection in different configurations, the conductive material sputtered on the paper support was platinum.

Figure 6A:
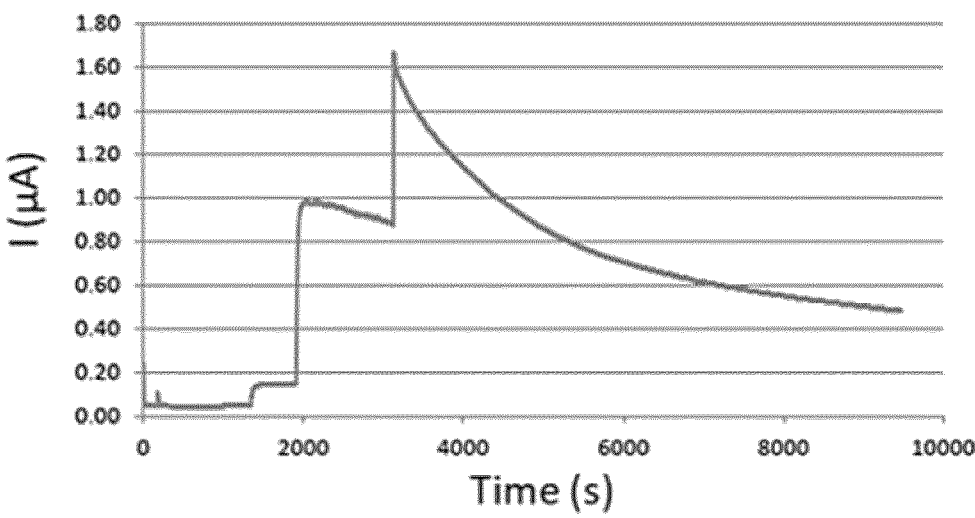
FIG. 6: a) Response and b) calibration curve of the sensor in FIG. 5 in solution mode.
Figure 6B:
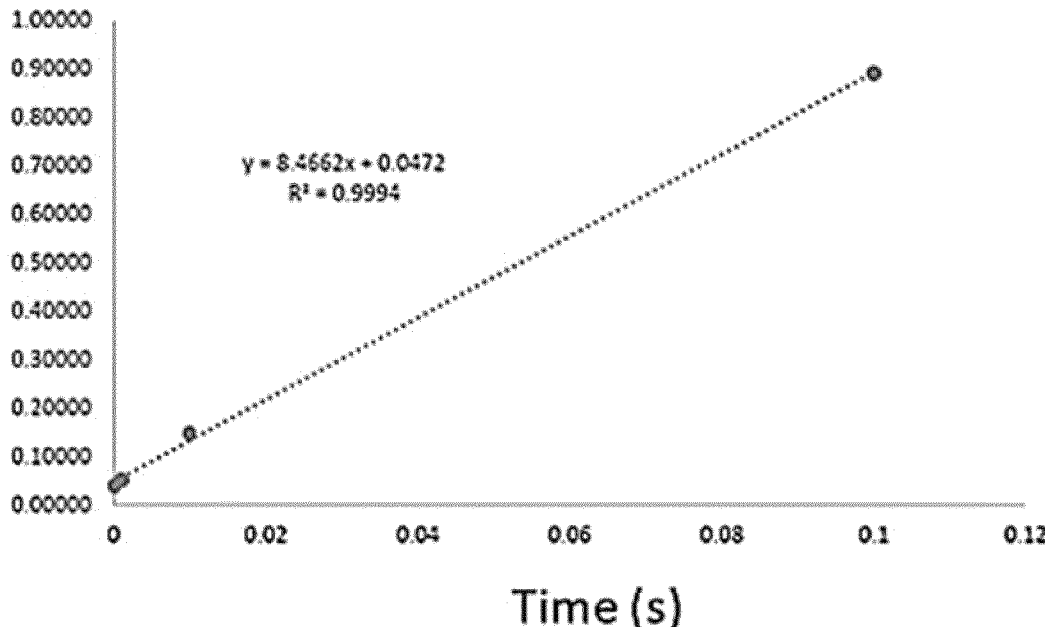

FIG. 6A shows the response for the electrochemical sensor when immersed in a solution of $H_2O_2$. The additions give a positive response (from 0.04 to 1.65 µA) with a sensitivity of 8.4 µA per mM of $H_2O_2$ in the linear range from 0.001 to 0.1 mM of $H_2O_2$ (FIG. 6B reports the corresponding calibration curve). Importantly, these results confirmed that the proposed amperometric cell-using a single exposed electrode configuration, with the front electrode being porous to the solution-effectively closes the circuit and allows detecting $H_2O_2$ in solution. It further confirmed that it is possible to detect $H_2O_2$ in solution using two electrodes (front and back) from the same material. To the best of our knowledge, this is the first report for this kind of configuration for the detection of chemical species in solution.

Figures 7A, 7B:
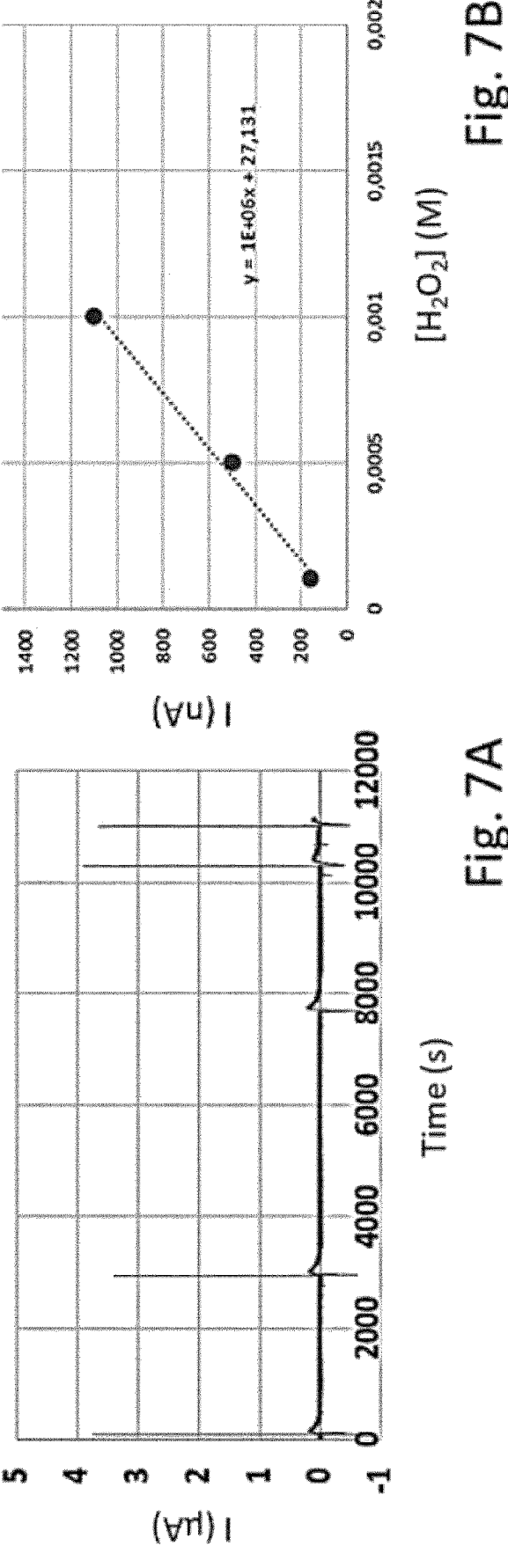
FIG. 7: a) Response and b) calibration curve of the sensor in FIG. 5 in single volume mode.

Moreover, the proposed configuration allows detection in reduced volume. FIG. 7A shows the response for the electrochemical sensor when a single volume is contacted to its front electrode. The detection was performed in a single drop of 100 to 1000 nL reducing the sample size, which is crucial, for example, in blood fingerprick or in wearable. Noteworthy further reduction of volume down to the single µL was possible based on the geometry optimization. The current signal obtained for different injected volumes can be seen in FIG. 8. Analytical figures are comparable to the ones in solution although with a shifted linear range. The sensitivity here was 100 nA/mM in the 0.1-1 mM linear range (FIG. 7B reports the corresponding calibration curve). It is noted that this sensibility is up to 5 times higher than other sensors in single volume analysis which is a remarkable increase. As mentioned before, this is explained by the macroporosity of the working electrode, which increases the exposed surface and promotes the diffusion of atmospheric oxygen facilitating chemical interactions. Furthermore, extremely fast response was observed, in the 100-millisecond time scale. To the best of our knowledge, this is the first report for this kind of configuration for the detection of chemical species in a single volume.

Figure 9A:
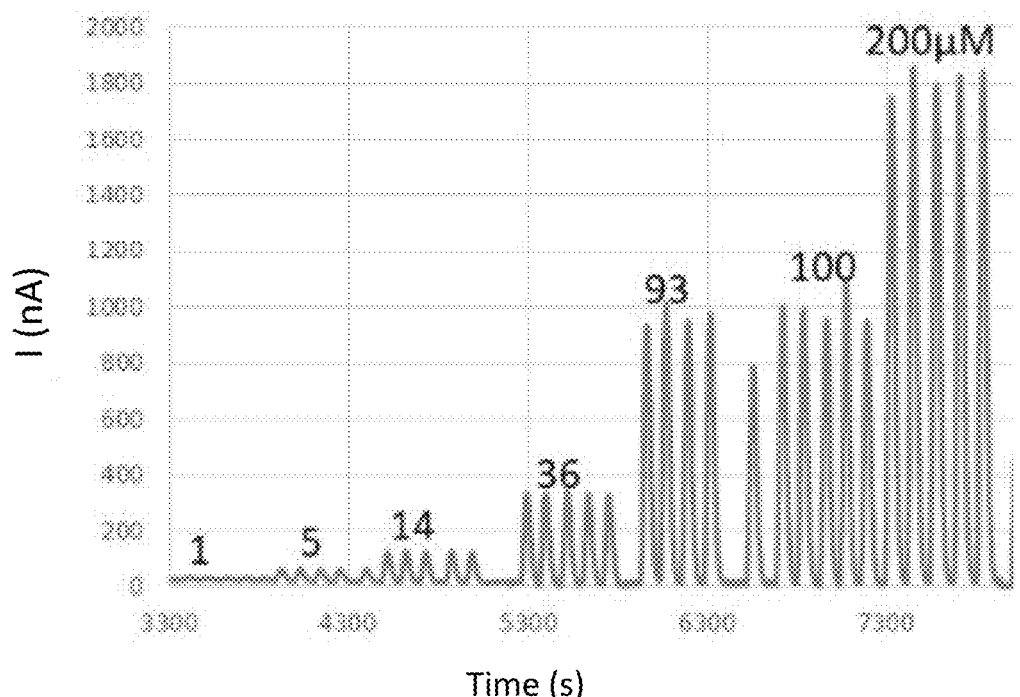
FIG. 9: a) Response and b) calibration curve of the sensor in FIG. 3 in continuous flow mode.
Figure 9B:
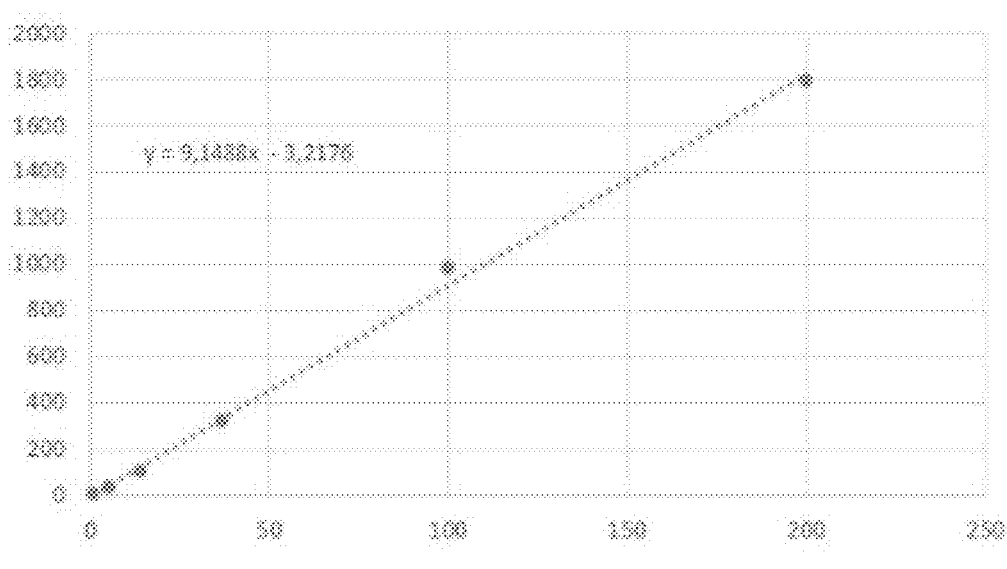

A final application of the configuration of the electrochemical sensor is the detection in a continuous flow such as shown in FIG. 9A. The detection was performed in a continuous flow of buffer solution at 100 μL/min (1.6 μL/s), where 20 μL injection of peroxide at different concentrations were performed. Results showed extremely good stability of the baseline, high level of reproducibility of the signal, very good sensitivity and limit of detection with a low sample volume required. The sensitivity was of 9 nA/μM with a linear range for 1 to 200 μM (FIG. 9B reports the corresponding calibration curve). The sensor was calibrated at different low concentrations varying from 1 to 6 μM providing exquisite stability, sensitivity and reproducibility (RSD<5% under optimal conditions). These results showed that this configuration could be applied to continuous flow systems, wherein one of the main channels is to incorporate 3 electrodes simultaneously in a single flow channel. This configuration opens the window to provide either smaller electrodes or more sensitive ones while simplifying current designs. Furthermore, there are no interference due to ascorbic acid in when using this configuration as seen in FIG. 11. To the best of our knowledge, this is the first report for this kind of configuration for the detection of chemical species in continuous flow.

Example 3: Glucose Detection

Figure 10:
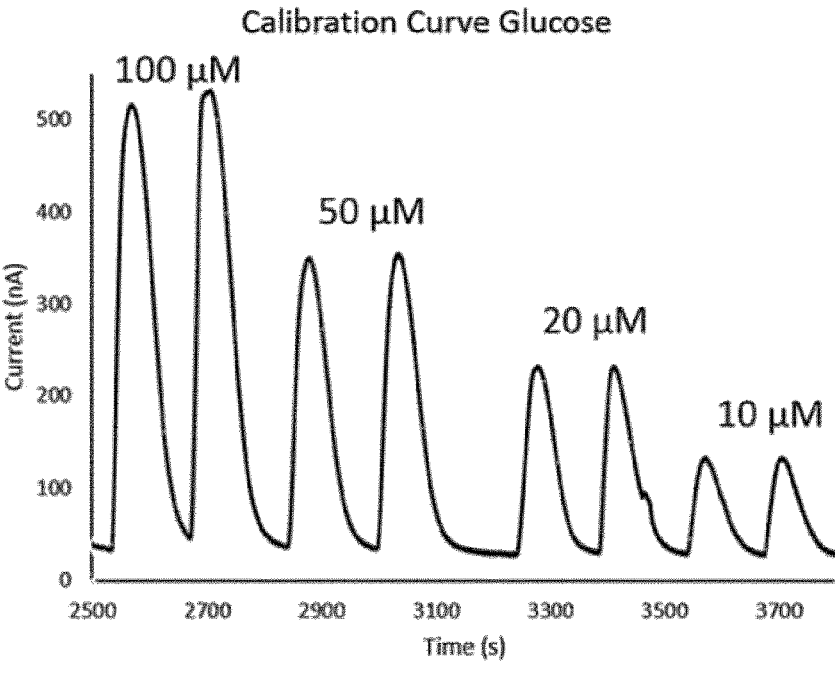
FIG. 10: a) Time trace of glucose sensor in flow in self-powered mode (the numbers indicate the glucose concentration injected).

In addition, a glucose current based sensor was built: GOx enzyme was entrapped in the first layer of Nafion® so that it catalyses the oxidation of glucose added to the solution producing $H_2O_2$, which is detected by the working electrode. FIG. 10 shows the time trace of a glucose self-powered sensor in flow with the corresponding glucose concentration injected. Outstanding detection was given in the 10-100 μM range. Thus, these results confirm that the new configuration could be used for real application having an analytical performance similar to other reported glucose biosensors.

Example 4: ELISA for IgG Based on Antibody GOx Labelled

Figure 12A:
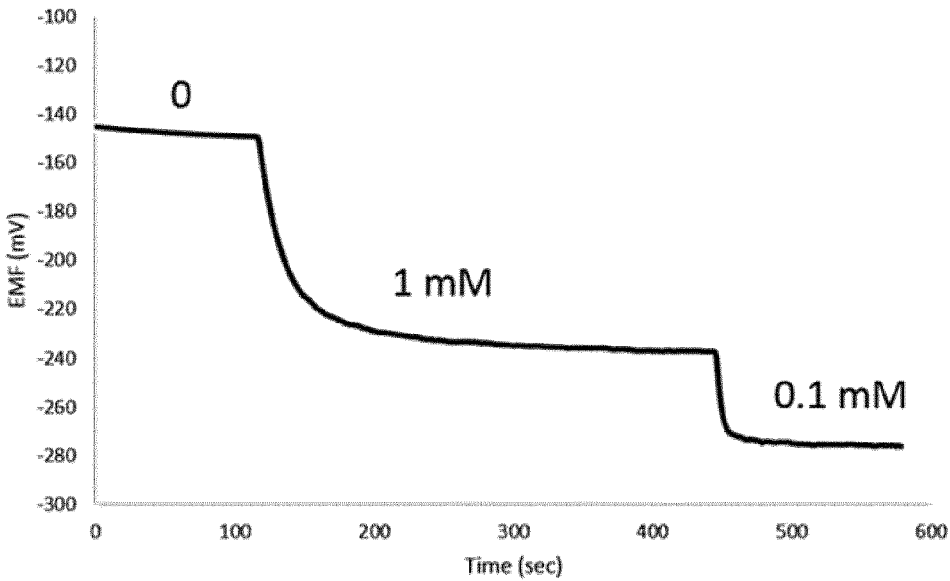
FIG. 12: a) Time-trace potential reading of a single electrode after the immunoreaction and the GOx-labelled antibody. The signals correspond to increasing additions of Glucose (0.1 and 1 mM) b) Time-trace current reading of a single electrode after the immunoreaction and the GOx-labelled antibody. The signals correspond to increasing additions of Glucose (0.1 and 1 mM).
Figure 12B:
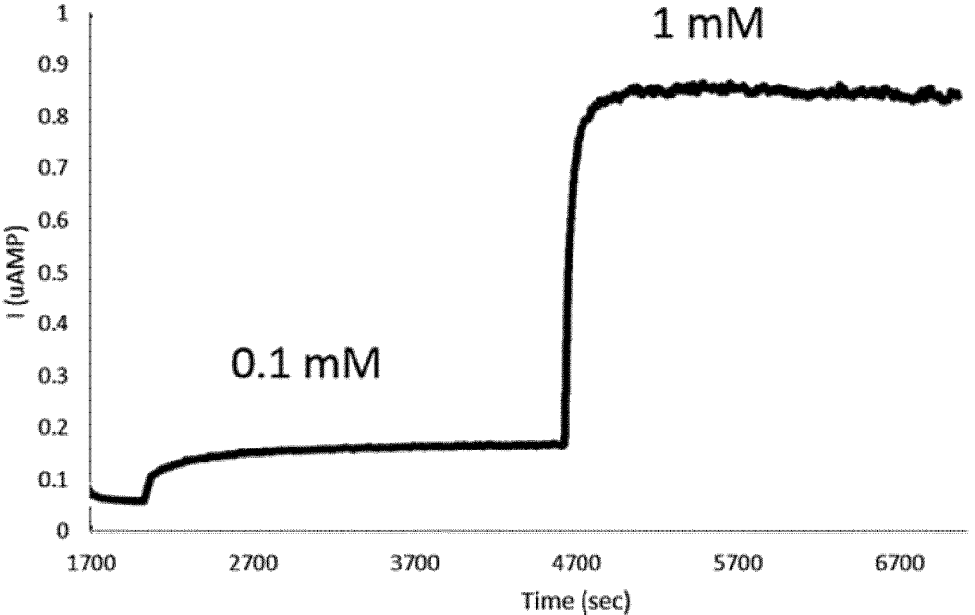

In addition to hydrogen peroxide and glucose detection, an immunoreaction was detected. A first antibody was immobilized onto the Nation® coating of the front electrode, then IgG was added to the sensor (1 μg/mL) and eventually the antibody labelled with GOx. After suitable washing procedure, FIG. 12 shows the detection upon consecutive addition of 0.1 and 1 mm Glucose in PBS. FIG. 12A displays the time-trace potential reading of a single electrode after the immunoreaction and the GOx-labelled antibody. FIG. 12B shows the time-trace current reading of a single electrode after the immunoreaction and the GOx-labelled antibody. From these experiments, it is showed that label-based reactions can be detected.

The invention claimed is:

1. A method of determining the presence and/or concentration of hydrogen peroxide in an aqueous solution using an electrochemical sensor comprising:
   i. a front porous electrode comprising pores permeable to the aqueous solution and comprising a sensitive surface which is sensitive to the hydrogen peroxide;
   ii. an electrolytic conductor bridge permeable to the aqueous solution; and iii. a back electrode comprising at least a surface and optionally a support;
   wherein the front electrode and the back electrode are electrically connected via the electrolytic conductor bridge; wherein the front electrode comprises pores above 0.2 μm of equivalent diameter that connect the external surface of the front electrode and the electrolytic conductor bridge;
   wherein the sensitive surface of the front porous electrode is a hydrogen peroxide sensitive surface and is selected from the group consisting of: copper, nickel, Prussian blue-coated materials, Prussian blue-coated composites, palladium, palladium nanomaterials and platinum or platinum derivatives;
   wherein the electrochemical sensor is configured so that the aqueous solution only enters in contact with the back electrode through the electrolytic conductor bridge, which in turn only enters in contact with the aqueous solution through the pores of the front electrode;
   wherein the electrochemical sensor further comprises means for determining the difference in the electrochemical state between the front electrode and the back electrode;
   and wherein the determination of such difference in the electrochemical state indicates the hydrogen peroxide presence and/or concentration in the aqueous solution;
   the method comprising:
      a. contacting the aqueous solution with the sensitive surface of the front electrode of the electrochemical sensor;
      b. determining the difference in the electrochemical state between the front electrode and the back electrode; and
      c. determining the presence and/or concentration of the hydrogen peroxide in the aqueous solution based on the difference in the electrochemical state.

2. The method according to claim 1, wherein the front electrode of the electrochemical sensor comprises a pore density configured to provide a Herzberg flow rate lower than 2500 s/100 mL.

3. The method according to claim 1, wherein the front electrode of the electrochemical sensor comprises pores between 0.2 μm and 50 μm.

4. The method according to claim 1, wherein the electrochemical sensor is a current-based sensor; wherein the front electrode is the working electrode and the back electrode is the counter electrode; wherein the counter electrode carries out a complementary Faradaic reaction to the reaction carried out in the working electrode; and wherein the means for determining the difference in the electrochemical state is connected between the front electrode and the back electrode and configured to measure a current flowing between the front electrode and the back electrode.

5. The method according to claim 4, wherein the current-based sensor employs the energy generated at the interface of the front electrode when in contact with the aqueous solution to power the sensor.

6. The method according to claim 4, wherein the current-based sensor further comprises a voltage source connected between the front electrode and the back electrode configured to apply a potential between the electrodes.

7. The method according to claim 4, wherein the electrolytic conductor bridge of the current-based sensor connecting the electrodes is selected from any of the following list consisting of: a polyelectrolyte, a solid polymer electrolyte, an ionogel and a ionomer such as tetrafluoroethylene-per-fluoro-3,6-dioxa-4-methyl-7-octenesulfonic acid copolymer.

8. The method according to claim 4, wherein the back electrode of the current-based sensor comprises a conductive material selected from any of the following list consisting of: zinc, silver/silver chloride, conducting polymers such as PEDOT-PSS and platinum or platinum derivatives such as platinum-coated carbon materials and platinum nanomaterials.

9. The method according to claim 4, wherein the hydrogen peroxide sensitive surface of the front electrode and the back electrode of the current-based sensor comprise or are made of platinum.

10. The method according to claim 4, wherein the hydrogen peroxide sensitive surface of the front electrode and the back electrode of the current-based sensor comprise or are made of platinum and wherein the electrolytic conductor bridge is tetrafluoroethylene-perfluoro-3,6-dioxa-4-methyl-7-octenesulfonic acid copolymer.

11. The method according to claim 1, wherein the electrochemical sensor is a potential-based sensor; wherein the front electrode is the working electrode and the back electrode is the reference electrode; wherein the reference electrode provides a stable potential; and wherein the means for determining the difference in the electrochemical state connected between the front electrode and the back electrode and configured to measure the difference in voltage between the front electrode and the back electrode.

12. The method according to claim 11, wherein the electrolytic conductor bridge (14) of the potential-based sensor connecting the electrodes is selected from any of the following list consisting of: a polyelectrolyte, a solid polymer electrolyte, an ionogel and a ionomer such as tetrafluoroethylene-perfluoro-3,6-dioxa-4-methyl-7-octenesulfonic acid copolymer.

13. The method according to claim 11, wherein the reference electrode of the potential-based sensor comprises a conductive material selected from any of the following list consisting of: silver, platinum, gold, nickel, zinc, copper, silver/silver chloride, conducting polymers such as PEDOT-PSS, aluminium and carbon.

14. The method according to claim 11, wherein the hydrogen peroxide sensitive surface of the front electrode and the back electrode of the potential-based sensor comprise or are made of platinum.

15. The method according to claim 11, wherein the hydrogen peroxide sensitive surface of the front electrode and the back electrode of the potential-based sensor comprise or are made of platinum and wherein the electrolytic conductor bridge is tetrafluoroethylene-perfluoro-3,6-dioxa-4-methyl-7-octenesulfonic acid copolymer.

16. The method according to claim 1, wherein the front electrode and/or the back electrode of the electrochemical sensor further comprise a support which in turn comprises a conductive material.

17. The method according to claim 1, wherein the front electrode, the electrolytic conductor bridge and the back electrode of the electrochemical sensor are configured so that these are stacked.

18. The method according to claim 1, wherein the method further determines the presence and/or concentration of a target analyte through the measurement of hydrogen peroxide;

wherein the front electrode of the electrochemical sensor is functionalized with an oxidase or dehydrogenase enzyme selected from the group consisting of glucose oxidase, glucose dehydrogenase, cholesterol oxidase, cholesterol dehydrogenase, lactate oxidase, lactate dehydrogenase, bilirubin oxidase, bilirubin dehydrogenase, amino acids oxidase and amino acids dehydrogenase;

wherein the front electrode of the electrochemical sensor is configured to produce hydrogen peroxide when in contact with the target analyte that the electrochemical sensor measures; and wherein the method further comprises determining the presence and/or concentration of the target analyte in the aqueous solution based on the determined concentration of hydrogen peroxide.

19. The method according to claim 1, wherein the method further determines the presence and/or concentration of a target analyte in an aqueous solution through the measurement of hydrogen peroxide;

wherein the electrochemical sensor is functionalised with a capture entity that captures the target analyte if present;

wherein the electrochemical sensor further comprises means for detecting the target analyte wherein said means are at least a detection entity and a substrate and wherein said detection entity is capable of detecting the target analyte and is labelled with an enzyme capable of producing hydrogen peroxide when exposed to the substrate, and wherein the method further comprises:

a. contacting the sensitive surface of the front electrode of the electrochemical sensor with the detection entity so that the detection entity binds to the target analyte if present;

b. optionally rinsing the sensitive surface; and adding the substrate so as to produce hydrogen peroxide if the detection entity is present;

c. determining the presence and/or concentration of the target analyte in the aqueous solution based on the difference in the electrochemical state.

* * * * *